(12) United States Patent
Kakui

(10) Patent No.: US 9,588,833 B2
(45) Date of Patent: Mar. 7, 2017

(54) INFORMATION PROCESSING SYSTEM MONITORING APPARATUS, MONITORING METHOD, AND MONITORING PROGRAM

(71) Applicant: Hitachi, Ltd., Tokyo (JP)

(72) Inventor: Kentaro Kakui, Tokyo (JP)

(73) Assignee: Hitachi, Ltd. (JP)

( * ) Notice: Subject to any disclaimer, the term of this patent is extended or adjusted under 35 U.S.C. 154(b) by 26 days.

(21) Appl. No.: 14/427,933

(22) PCT Filed: Oct. 29, 2013

(86) PCT No.: PCT/JP2013/079186
§ 371 (c)(1),
(2) Date: Mar. 12, 2015

(87) PCT Pub. No.: WO2014/109112
PCT Pub. Date: Jul. 17, 2014

(65) Prior Publication Data
US 2015/0254125 A1    Sep. 10, 2015

(30) Foreign Application Priority Data

Jan. 11, 2013  (JP) ................................. 2013-003055

(51) Int. Cl.
*G06F 11/00* (2006.01)
*G06F 11/07* (2006.01)
(Continued)

(52) U.S. Cl.
CPC ........ *G06F 11/0751* (2013.01); *G06F 11/008* (2013.01); *G06F 11/0709* (2013.01);
(Continued)

(58) Field of Classification Search
CPC .................................................. G05B 23/0283
(Continued)

(56) References Cited

U.S. PATENT DOCUMENTS 7,809,661 B2 * 10/2010 D'Ambrosio .......... G06Q 10/06
706/45
7,895,323 B2   2/2011 Gupta et al.
(Continued)

FOREIGN PATENT DOCUMENTS

JP    2007-286924 A    11/2007
JP    2008-293128 A    12/2008
(Continued)

*Primary Examiner* — Amine Riad
(74) *Attorney, Agent, or Firm* — Volpe and Koenig, P.C.

(57) ABSTRACT

Provided is a method of detecting a warning sign indicating the occurrence of a system failure targeting a plurality of varied information processing systems. A system for monitoring a plurality of monitored systems receives measured values regarding a plurality of indexes, designates, from a plurality of prediction models, a prediction model for predicting a future measured value from the measured value that was received regarding a reference index, predicts a predicted value of the reference index based on the designated prediction model, generates or updates a Bayesian network targeting the reference index and a target index, and calculates a probability that a measured value of the target index will become a predetermined value or fall within a predetermined value range.

18 Claims, 33 Drawing Sheets

(51) Int. Cl.
*G06F 11/34* (2006.01)
*G06N 7/00* (2006.01)
*G06F 11/32* (2006.01)

(52) U.S. Cl.
CPC ...... *G06F 11/3419* (2013.01); *G06F 11/3452* (2013.01); *G06N 7/005* (2013.01); *G06F 11/323* (2013.01)

(58) Field of Classification Search
USPC .......................................................... 714/47.3
See application file for complete search history.

(56) References Cited

U.S. PATENT DOCUMENTS

| | | | | |
|---|---|---|---|---|
| 8,069,370 B1* | 11/2011 | Li | ................... | G06F 11/0709 714/26 |
| 8,078,913 B2* | 12/2011 | Goldszmidt | ........ | G06F 11/0709 702/185 |
| 8,086,899 B2* | 12/2011 | Basu | ................... | G06F 11/079 714/26 |
| 8,135,995 B2* | 3/2012 | Ngai | ................... | G06F 11/0748 714/45 |
| 8,156,377 B2* | 4/2012 | Li | ................... | G06F 11/0709 714/26 |
| 8,230,262 B2* | 7/2012 | Li | ................... | G06F 11/008 714/26 |
| 8,447,710 B1* | 5/2013 | Das | ................... | G06N 7/005 706/14 |
| 8,463,641 B2* | 6/2013 | Reddy | ................... | G06Q 10/04 705/7.11 |
| 8,489,530 B2* | 7/2013 | De | ................... | G06N 7/005 703/2 |
| 8,694,836 B2* | 4/2014 | Lapiotis | ................ | G06F 11/079 714/25 |
| 2002/0019870 A1* | 2/2002 | Chirashnya | ......... | H04L 41/0681 709/224 |
| 2004/0193938 A1* | 9/2004 | Shah | ................... | H04L 1/22 714/2 |
| 2004/0193958 A1* | 9/2004 | Shah | ................... | G05B 23/0278 714/37 |
| 2004/0205397 A1* | 10/2004 | Rajiv | ................... | G05B 17/02 714/25 |
| 2004/0205398 A1* | 10/2004 | Osborn | ............. | G05B 23/0278 714/25 |
| 2005/0028033 A1* | 2/2005 | Kipersztok | ......... | G06F 11/2257 714/27 |
| 2007/0143338 A1* | 6/2007 | Wang | ................... | G06N 7/005 |
| 2011/0161743 A1 | 6/2011 | Kato | | |
| 2012/0166869 A1* | 6/2012 | Young | ................... | G06F 11/008 714/15 |

FOREIGN PATENT DOCUMENTS

JP 2012-113556 A 6/2012
WO 2010/032701 A1 3/2010

\* cited by examiner

FIG. 4 (a)

| ACQUISITION TIME | INTERVAL | PROCESSOR ID | CPU% | Idle% | System% | User% | Wait% | ... |
|---|---|---|---|---|---|---|---|---|
| 2012-04-01T00:00:00 | 15 | 0 | 0.20 | 98.21 | 0.13 | 0.07 | 1.59 | |
| 2012-04-01T00:00:15 | 15 | 0 | 0.37 | 96.25 | 0.25 | 0.12 | 3.38 | |

| ACQUISITION TIME | INTERVAL | Free Mem MB | Used Mem MB | Total Mem MB | Free Swap MB | Used Swap MB | Total Swap MB | |
|---|---|---|---|---|---|---|---|---|
| 2012-04-01T00:00:00 | 15 | 854 | 3097 | 3952 | 1983 | 0 | 1983 | |
| 2012-04-01T00:00:15 | 15 | 854 | 3097 | 3952 | 1983 | 0 | 1983 | |

SYSTEM PROFILE 410

| ID | SYSTEM NAME | MEASURED METRIC 1 | MEASURED METRIC 2 | MEASURED METRIC 3 | ... | MEASURED METRIC 3 | MEASURED METRIC 4 | ... |
|---|---|---|---|---|---|---|---|---|
| S1 | sys1.example.com | srv01.cpu | srv02.cpu | | | app1.cu | app1.art | |
| S2 | sys2.example.com | srv04.cpu | srv04.mem.used | | | app2.cu | app2.func1.art | |
| S3 | sys3.example.net | srv05.net.tx | srv05.net.rx | | | app3.cu | app3.func1.art | |
| ... | | | | | | | | |

FIG. 6 (a)

| ACQUISITION TIME | srv01.cpu | srv02.cpu | srv03.cpu | ... | srv01.me m.used | srv02.me m.used | srv03.mem .used | ... |
|---|---|---|---|---|---|---|---|---|
| 2012-04-01T00:00:00 | 0.07 | 0.13 | 1.59 | | 1845 | 3097 | 450 | |
| 2012-04-01T00:00:15 | 0.12 | 0.25 | 3.38 | | 1845 | 3097 | 450 | |
| 2012-04-01T00:00:30 | 0.18 | 0.21 | 1.18 | | 1848 | 3098 | 451 | |
| 2012-04-01T00:00:45 | 0.25 | 0.33 | 2.21 | | 1851 | 3100 | 451 | |
| ... | | | | | | | | |

| ACQUISITION TIME | CLI | ART | srv01.cpu | srv02.cpu | srv03.cpu | ... | srv01.mem.used | srv02.mem.used | srv03.mem.used | ... |
|---|---|---|---|---|---|---|---|---|---|---|
| 2012-04-01T00:00:00 | 20 | 122 | 0.07 | 0.13 | 1.59 | | 1845 | 3097 | 450 | |
| 2012-04-01T00:00:15 | 24 | 124 | 0.12 | 0.25 | 3.38 | | 1845 | 3097 | 450 | |
| 2012-04-01T00:00:30 | 28 | 145 | 0.18 | 0.21 | 1.18 | | 1848 | 3098 | 451 | |
| 2012-04-01T00:00:45 | 32 | 150 | 0.25 | 0.33 | 2.21 | | 1851 | 3100 | 451 | |
| ... | | | | | | | | | | |

| PREDICTION PROFILE ID | SYSTEM NAME | MODEL ID | PREDICTION MODEL ID | DEFAULT LEAD TIME | REFERENCE INDEX | TARGET INDEX | PREDICTED EVENT | ... |
|---|---|---|---|---|---|---|---|---|
| P1 | sys1.example.com | M1 | F1 | 600 | app1.cu | app1.art | T>3000 | |
| P2 | sys2.example.com | M2 | F1 | 900 | app2.cu | app2.func1.art | T>5000 | |
| P3 | sys3.example.net | M3 | F2 | 1800 | app3.cu | app3.func1.art | T>3000 | |
| P4 | sys1.example.com | M4 | F1 | 600 | app1.cu | app1.art | T>3000 | |
| P5 | sys2.example.com | M2 | F1 | 900 | app2.cu | app2.func2.art | T>7000 | |
| P6 | sys3.example.net | M3 | F2 | 3600 | app3.cu | app3.func1.art | T>3000 | |
| ... | | | | | | | | |

MODEL REPOSITORY 413

| ID | MODEL NAME | STRUCTURE | PARAMETER |
|---|---|---|---|
| M1 | 20120402-01 | [sys1] | [2012-04-01T00:00/24:00] |
| M2 | Default | [sys2] | [2012-03-30T09:00/18:00] |
| M3 | Model_for_sys3 | [sys3] | [2012-03-26T09:00/30T18:00] |
| M4 | 20120326-01 | [sys1] | [2012-03-25T00:00/24:00] |
| M5 | 20120312-01 | [sys1-old] | [2012-03-11T00:00/24:00] |
| ... | | | |

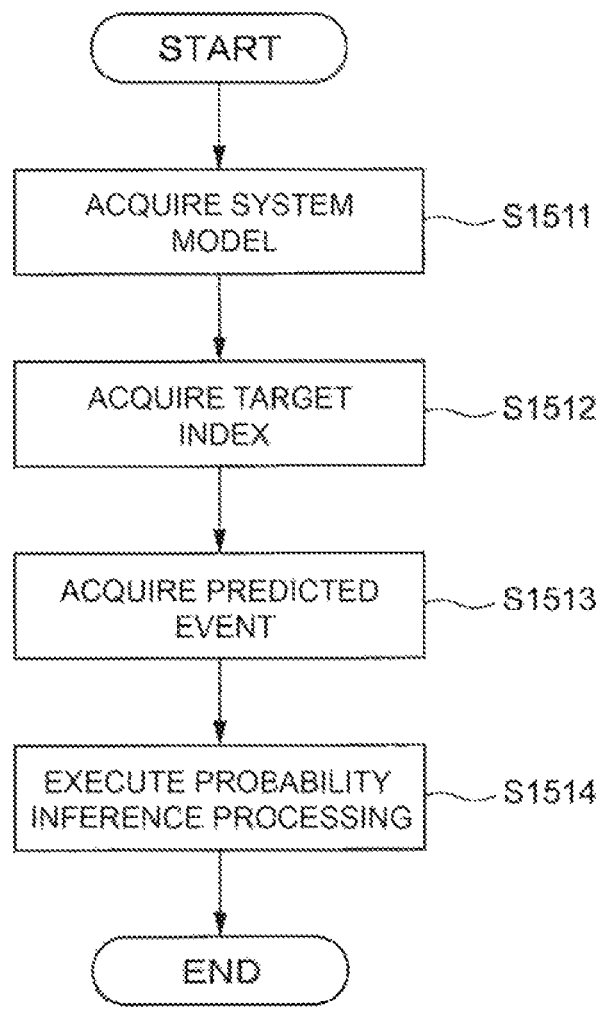

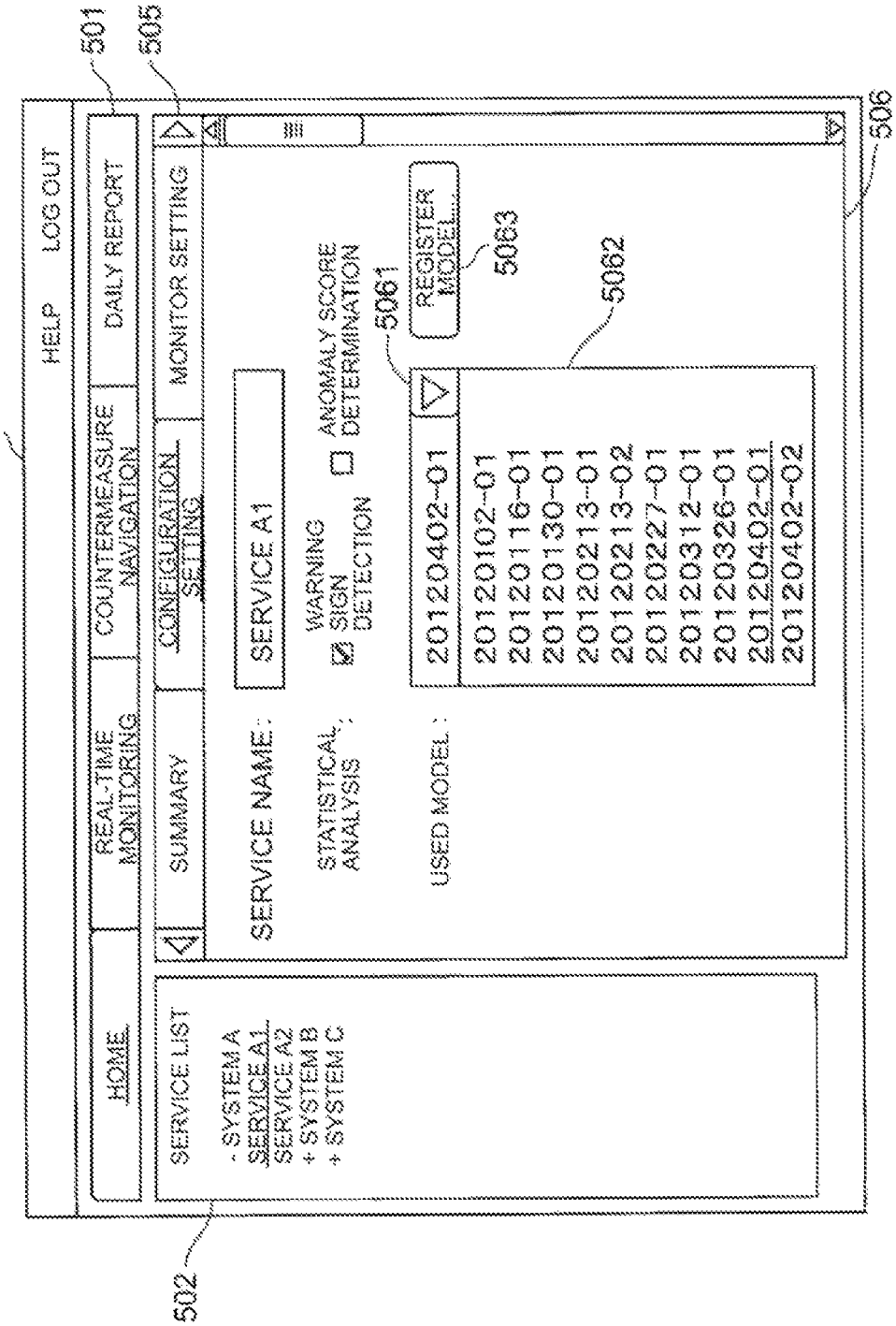

| THREAD ID | RESPONSE TIME | ELAPSED TIME | TIME STAMP | ... |
|---|---|---|---|---|
| 1-160 | 543 | 601 | 2012-04-01T00:01:59.861 | |
| 1-163 | 519 | 577 | 2012-04-01T00:01:59.887 | |
| 1-167 | 366 | 625 | 2012-04-01T00:01:59.912 | |
| 1-155 | 381 | 640 | 2012-03-31T00:02:00.011 | |
| 1-190 | 356 | 615 | 2012-04-01T00:02:00.253 | |
| 1-140 | 376 | 635 | 2012-04-01T00:02:00.470 | |
| ... | | | | |

415 TASK LIST

| ID | EXECUTION FLAG | PRIORITY | INTERVAL | LAST UPDATE | UNDER EXECUTION |
|---|---|---|---|---|---|
| P1 | Y | 0 | 60 | 2012-04-01T12:17:00 | 13223 |
| P2 | Y | 0 | 60 | 2012-04-01T12:17:00 | 13230 |
| P3 | Y | 0 | 180 | 2012-04-01T12:15:00 | NULL |
| P4 | N | 0 | 60 | 2012-03-31T23:59:00 | NULL |
| P5 | Y | 5 | 60 | 2012-04-01T12:17:00 | 13239 |
| P6 | Y | 10 | 180 | 2012-04-01T12:15:00 | NULL |
| ... | | | | | |

INFORMATION PROCESSING SYSTEM MONITORING APPARATUS, MONITORING METHOD, AND MONITORING PROGRAM

TECHNICAL FIELD

The present invention relates to a monitoring apparatus, a monitoring method and a monitoring program of an information processing system, and in particular relates to an apparatus and the like for providing a service of remotely monitoring the operational status of an information processing system, detecting a warning sign that indicates a failure will occur in the system, and notifying the detected warning sign.

BACKGROUND ART

In recent years, as information processing systems hold more prominent positions as the foundation of corporate activities and social infrastructures, various technologies have been developed with the objective of promptly detecting the occurrence of a failure in these information processing systems, or analyzing the root cause of the failure that occurred and taking prompt corrective actions, and these technologies are being applied to the operation/management service of systems. In addition, in recent years, the importance of the proactive failure detection technology of attempting to predict a failure, prior to the occurrence of such a failure, is attracting attention.

As a technology related to this kind of proactive failure detection, for instance, there is the technology disclosed in PTL 1. This technology relates to a system for predicting the occurrence of an important event in a computer cluster, and is specifically a hybrid prediction system that predicts the occurrence of a failure by inputting information such as an event log and a system parameter log into a model based on the Bayesian network.

CITATION LIST

Patent Literature

[PTL 1] Specification of U.S. Pat. No. 7,895,323

SUMMARY OF INVENTION

Technical Problem

Recently in this industrial field, a so-called cloud service business of providing services from a remote location to customers is being deployed on a widespread scale. Generally speaking, with this type of service business, there are cost benefits for customers from the perspective of being able to reduce the initial costs required for the hardware and software licenses, and there are cost benefits for service providers from the perspective of being able to consolidate and operate resources based on a so-called multi-tenant method of providing the service to a plurality of customers with a single system. The system operation/management service is also no exception to this trend.

In light of the foregoing circumstances, the existing failure prediction system described above is insufficient from the perspective of applicability to the diversity of information processing systems, which is demanded in the course of providing the cloud service business. For example, the existing failure prediction system is unable to deal with the differences in the characteristics of diversified systems and applications, and the requests from service users. Moreover, the existing failure prediction system is unable to deal with the problem of the time consuming task that is required for generating the Bayesian network.

Thus, the present invention provides a method, a program, an apparatus and a system for proactively detecting an occurrence of a failure as a cloud service business targeting a plurality of varied information processing systems. For example, the present invention provides a failure prediction method, with a reduced processing load, as the cloud service business while dealing with the diversity of information processing systems.

Solution to Problem

In order to resolve the foregoing problems, a service system which is configured from one or more computers and performs a failure prediction of a plurality of monitored systems (1) receives measured values regarding a plurality of metrics from the monitored systems, (2) designates a prediction model for predicting a future value from the received measured values, from a plurality of prediction models, for a reference index which is a part of the plurality of metrics, (3) predicts a value of the reference index based on the designated prediction model, (4) generates or updates a Bayesian network containing the reference index, and a target index which is a metric that is a part of the plurality of metrics but different from the reference index, and (5) calculates a probability that a measured value of the target index will become a predetermined value or fall within a predetermined value range based on the predicted value of the reference index, and the Bayesian network.

Advantageous Effects of Invention

According to the present invention, it is possible to provide a cloud service business for proactively detecting an occurrence of a failure targeting a plurality of varied information processing systems.

Other objects, configurations and effects will be become apparent based on the ensuing explanation of embodiments.

BRIEF DESCRIPTION OF DRAWINGS

FIG. 4(a) is a table showing an example of the metrics and measured values that are collected from the production server.

FIG. 4(b) is a table showing another example of the metrics and measured values that are collected from the production server.

FIG. 5 is a system profile table.

FIG. 6(a) is a table showing an example of the concatenated measured values.

FIG. 6(b) is a table showing an example of the concatenation of the measured values including the performance metrics.

FIG. 8 is a prediction profile table.

FIG. 12(*b*) is a flowchart showing an example of the operation of the system model generation processing based only on the parameter learning.

FIG. 13(*b*) is a diagram showing an example of the prediction model repository.

FIG. 14(*b*) is a flowchart showing an example of the operation of the time series prediction processing.

FIG. 14(*c*) is a flowchart showing an example of the operation of the probability inference processing.

FIG. 15(*b*) is a flowchart showing another example of the operation of the probability inference processing.

FIG. 19(*a*) is a layout diagram showing an example of the client screen that is set to enable the selection of the system model.

FIG. 19(*b*) is a layout diagram showing another example of the client screen that is set to enable the selection of the system model.

FIG. 20 is a diagram showing an example of the log of the load generation device.

FIG. 24(*b*) is a layout diagram showing another example of the client screen that is set to display the system anomaly score.

FIG. 25 is another example of the task list table.

DESCRIPTION OF EMBODIMENTS

Figure 1:
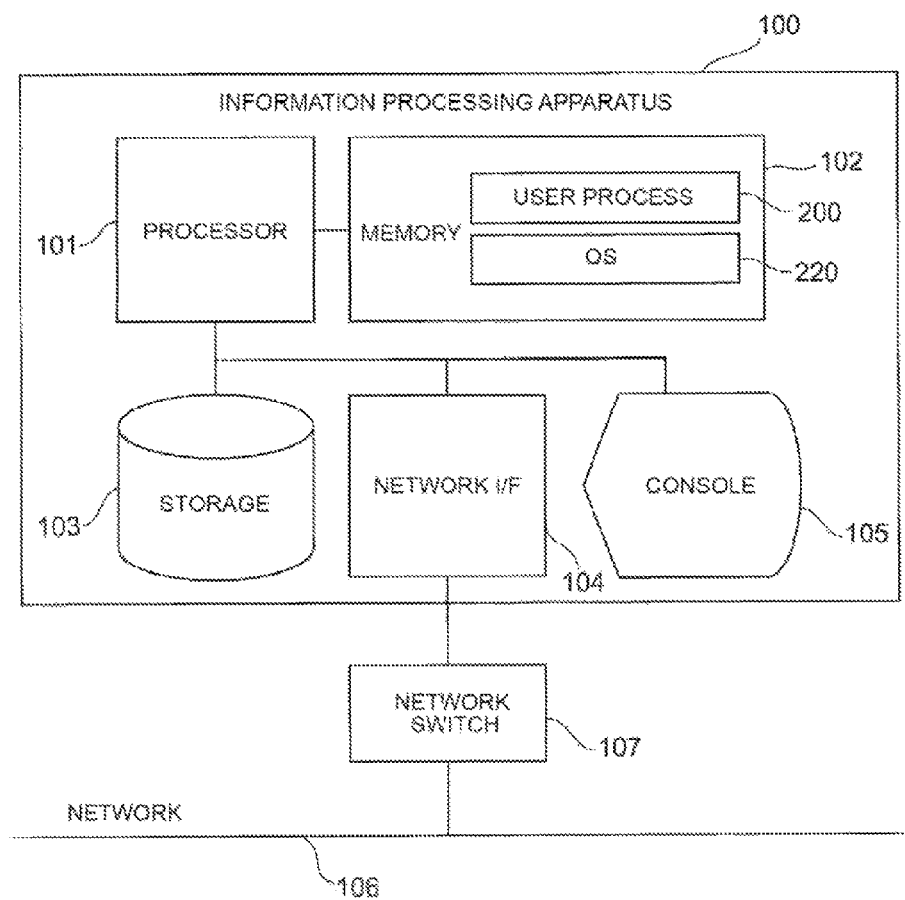
FIG. 1 is a block diagram showing an example of the configuration of the information processing apparatus.

Embodiments of the present invention are now explained in detail with reference to the drawings. Note that, in the ensuing explanation provided with reference to the drawings, the same component is given the same reference numeral, and the redundant explanation thereof is omitted or simplified.

Embodiment 1

Foremost, an example of a system operation/management apparatus for providing a failure prediction service is explained as the first embodiment.

FIG. 1 is a diagram showing an example of the configuration of the information processing apparatus.

An information processing apparatus 100 is configured from a processor 101, a memory 102, a storage 103, a network I/F 104, and a console 105. The processor 101 is connected to the memory 102, the storage 103, the network I/F 104, and the console 105. The network I/F 104 is connected to a network 106 via a network switch 107.

The information processing apparatus 100 is, for example, a rack-mount server, blade server, personal computer or the like. Moreover, the information processing apparatus 100 may comprise a plurality of processors 101, memories 102, storages 103, network I/Fs 104, or consoles 105. Moreover, the storage 103 is, for example, a hard disk drive (HDD) or a solid state drive (SSD) or the like, or a combination of a plurality of such drives. Moreover, the network 106 is, for example, an Ethernet (registered trademark), or a wireless network based on the IEEE802.11 standard, a wide area network based on the SDH/SONET standard, or the like. Moreover, the network 106 may also be a network obtained by combining a plurality of the network technologies described above.

The storage 103 can record data in a non-volatile manner, and read the recorded data. The network I/F 104 can communicate with the network I/F 104 of another information processing apparatus 100 via the connected network 106. The console 105 can display text information, graphical information and the like by using a display device, and receive information from connected human interface devices (not shown).

With the information processing apparatus 100, a user process 200 and an operating system (OS) 220 are loaded in the memory 102. The user process 200 and the operating system 220 are both programs and executed by the processor 101 of the information processing apparatus 100. Consequently, the information processing apparatus 100 can read and write data from and into the memory 102 or the storage 103, communicate with the user process 200 and the operating system 220 that are loaded in the memory of another information processing apparatus 100 via the network I/F 104 and the network 106, and display information on the console 105 and receive information from the same.

Figure 2:
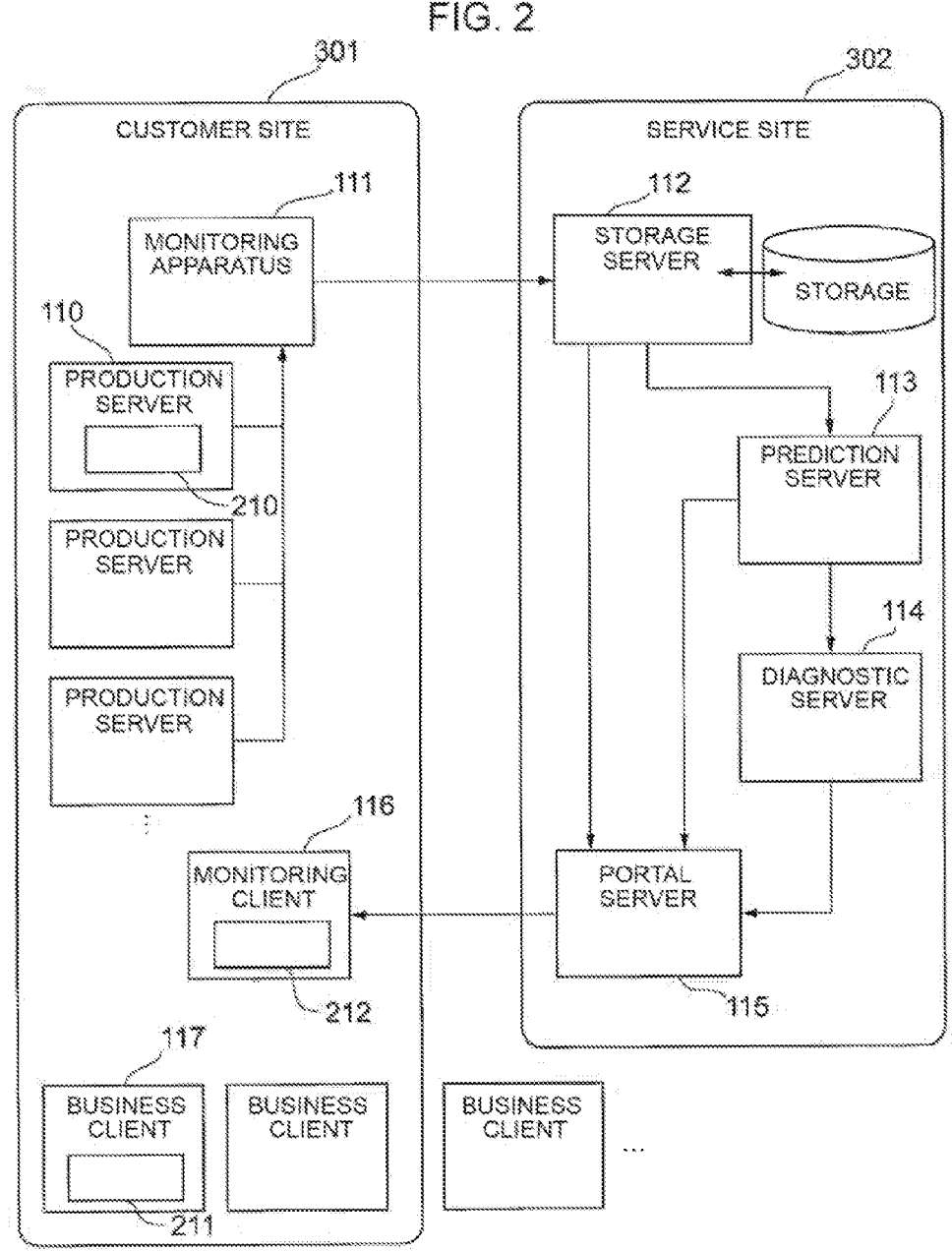
FIG. 2 is a block diagram showing an example of the mode of providing a failure prediction service.

FIG. 2 is a diagram showing an example of the mode of providing a system monitoring service.

The system monitoring service is configured from a customer site 310 and a service site 302. Both of these sites include one or more information processing apparatuses 100, and are configured from a network 106 that mutually connect the foregoing sites, and one or more network switches 107.

The customer site and the service site are typically located at geographically remote locations and connected via a wide area network, but other modes are also possible; for instance, both sites existing within the same data center and being connected by a network within the data center. Regardless of the mode, the information processing apparatus existing in the customer site and the information processing apparatus existing in the service site are able to communicate with each other via a network that is connected to the respective information processing apparatuses.

While this kind of communication between the sites may be restricted through settings of a network router or a firewall device (not shown) on grounds of maintaining information security, let it be assumed that the communication required in this embodiment is set to enable communication between the sites.

The customer site 301 includes a production server 110, a monitoring apparatus 111, a monitoring client 116, and a business client 117. An application program 210 is loaded as the user process in the production server 110, and the production server 110 executes the application program 210. The monitoring apparatus 111 periodically collects measured metrics from the production server. The foregoing processing is performed by the processor executing the programs stored in the storage of the monitoring apparatus 111. While the production server is typically the target for collecting the measured metrics, without limitation thereto, the measured metrics may also be collected for monitoring the business client 117, the network switch 107 or the like. Examples of the measured metrics to be collected will be described later. The monitoring client 116 presents information to the administrator of the customer site via the console, and receives the information that was input by the administrator. A business client program 211 is loaded as the user process in the business client 117, and the business client 117 executes the business client program 211. The business client program communicates with the application program 210 that is being executed by the production server. The method of configuring an application program for achieving a specific business objective based on the mutual communication between programs described above is referred to as the client/server model, and is typically known as a mode of Web application by those skilled in the art.

Moreover, the business client 117 may be located away from the customer site 301. This kind of business client communicates with the production server via a network that is connected to the business client and the production server, respectively.

The service site 302 includes a storage server 112, a prediction server 113, a diagnostic server 114, and a portal server 115. The storage server 112 periodically receives the measured values of metrics collected by the monitoring apparatus 111, and stores the measured values in the storage 103. Communication for receiving the measured values may be a method of starting the communication by the monitoring apparatus as the trigger, or contrarily a method of starting the communication by the storage server as the trigger.

The prediction server 113 receives the stored measured values from the storage server, and performs a failure prediction of detecting a warning sign indicating the occurrence of a failure. Note that the failure prediction processing is performed by generating a user process (hereinafter referred to as the "prediction engine") as a result of the processor executing the prediction engine program stored in the storage of the prediction server 113. Note that the prediction server stores information, which is required for performing the failure prediction processing, in a storage or a memory. As examples of the foregoing information, there are a system profile 410, a prediction profile 411, a task list 412, a model repository 413, and a prediction model repository 414. The foregoing information of the prediction server will be described later with reference to FIG. 7 and other drawings.

The diagnostic server 114 receives the result of the failure prediction from the prediction server, and selects the problem solving strategy for dealing with the contents of the warning sign. The foregoing processing is performed by the processor executing the programs stored in the storage of the diagnostic server 114.

The portal server 115 sends, in response to the request from the administrator of the customer site, the measured values stored in the storage server, the result of the failure prediction of the prediction server, and the problem solving strategy selected by the diagnostic server. Typically, a Web browser 212 that is loaded as a user process in the monitoring client 116 located at the customer site requests the portal server to present information triggered by the reception of the administrators instruction from the console, and the Web browser displays the information sent from the portal server on the console. Otherwise, the Web browser 212 may also be configured to request the presentation of information in predetermined arbitrary intervals. Moreover, the information presentation means is not limited to the display device of the console, and arbitrary means that is appropriate for the administrator, such as a phone or an email, may also be adopted.

The production server, the monitoring apparatus and the monitoring client of the customer site, and the storage server, the prediction server, the diagnostic server, the portal server and the business client of the service site are all configured in the same manner as the information processing apparatus 100 illustrated in FIG. 1. The processing that is performed in these servers is performed incidental to the user process generation by the processor executing the programs stored in the storage of the respective servers. Moreover, any of these apparatuses may be provided in a plurality for the purpose of distributing the processing load or improving the availability. Otherwise, one information processing apparatus may concurrently serve the roles of the plurality of types of servers described above. There is flexibility in the correspondence relation between a physical information processing apparatus and the roles as the server thereof, and it should be noted that this embodiment is merely an example among the numerous possible combinations.

As described above, by installing the storage server, the prediction server, and the diagnostic server in the service site, the information processing system of the customer site can use the failure prediction function without having to install these servers in the customer site. Since these servers require hardware resources such as a large-capacity storage and a high-speed processor for the accumulation and processing of data, the customer site can enjoy the benefit of not having to introduce such high performance, expensive hardware.

Moreover, the system monitoring service can also be provided to a plurality of customer sites. In FIG. 2, while the customer site and the service site respectively illustrated one embodiment, this does not mean that an individual service site is required for each customer site. A single service site can provide the service to a plurality of customer sites.

In the foregoing case, the series of server groups configuring the service site are used for providing the service to a plurality of customer sites. For example, the storage server 112 collects and accumulates the data sent from a plurality of monitoring apparatuses 111, and the portal server 115 provides information to a plurality of monitoring clients 116. Similarly, the prediction server 113 and the diagnostic server 114 perform the failure prediction and select the problem solving strategy based on the measured values collected by a plurality of monitoring apparatuses.

Since these information processing apparatuses of the service site handle the measured values collected in a plurality of customer sites separately for each customer site, they share codes for discriminating the individual customer sites. Since the method of discriminating data and protecting security through the assignment of such codes is known to those skilled in the art, such codes are omitted from the ensuing explanation. Moreover, such codes which assigned to information stored in the tables described later and information displayed by the console are similarly omitted.

Figure 3:
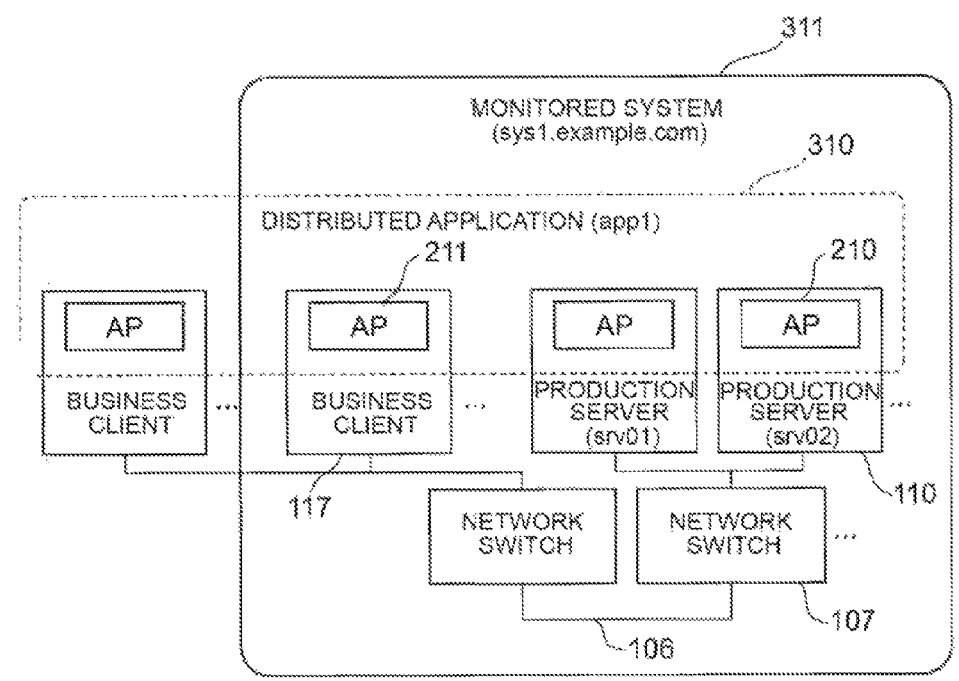
FIG. 3 is a block diagram showing an example of the concept of the monitored system.

FIG. 3 is a diagram showing an example of the monitored system installed at the customer site 301.

While the service target of the system monitoring service is often an individual production server of the customer site, the service target is not limited thereto. It was previously described that the production server is loaded with an application process as a user process. This kind of application program is not necessarily executed independently by the production server. Rather, a plurality of production servers are loaded with application programs each having separate roles, and programs such as middleware for supporting the execution, and the normal mode of an information processing system is that these plurality of programs communicate with each other and are executed in order to achieve a certain business objective. Generally speaking, an application where multiple programs distributed and loaded in a plurality of information processing apparatuses are run in coordination is referred to as a distributed application, and such an information processing system is referred to as a distributed processing system.

Typically, the production server 110 is loaded with an application program 210 as a user process. The business client 117 is loaded with a business client program 211 as a user process. Both the production server 110 and the business client 117 are provided in a plurality, and are mutually connected by the network 106 via the network switch 107.

The application program 210 and the business client program 211 configure one distributed application 310. In the system monitoring service, the device group in charge of executing the distributed application is referred to as a monitored system 311, and configures a unit for demarcating and differentiating the device groups configuring the customer site.

However, among the business clients 117, there may be certain business clients 117 that are unfit for being monitored by the monitoring apparatus even if they are a part of the distributed application 310 because they exist at a distance from the customer site, or the connection via a network is only temporarily, or other reasons. Moreover, for example, with a Web application that is configured for processing the communication of an unspecified number of business client programs via the internet, it would be difficult to monitor the individual business clients. These apparatuses may be placed outside the monitored system.

Generally speaking, the system operation/management service is not limited to comprehending the individual operational statuses of the information processing apparatuses installed at the customer site, and the operational status of the overall distributed processing system must also be comprehended. The concept of a "monitored system" in the system monitoring service was introduced in light of the foregoing circumstances.

FIG. 4 is a diagram showing an example of the measured metrics that were collected by the monitoring apparatus 111 from the production server.

In this embodiment, as individual examples of the measured metrics, FIG. 4(a) shows a table of the processor performance information 401, and FIG. 4(b) shows a table of the memory performance information 402. What is common between these tables is that the each record respectively includes a time that the information was acquired, and an interval of acquiring the information. In the case of the processor performance information, the interval shows the elapsed number of seconds during the accumulation of values for a metric, and the result of calculating the average rate from the accumulated values becomes the measured value. Meanwhile, in the case of the memory performance information, the collected value is a snapshot at the time that the value was collected, and the interval is literally the interval between times when the information was collected. The respective records additionally include a plurality of items of detailed performance information.

These measured values are typically acquired from the OS by an agent, which is loaded as a user process in the production server, according to methods such as executing a command, reading a special file, or using a dedicated API, and sent to the monitoring apparatus.

In this embodiment, while the foregoing two examples were described as representative measured metrics, without limitation thereto, statistical information that can be collected by the monitoring apparatus 111 can similarly be used as one type of measured metrics. For example, the data traffic of each network port can be collected from the network switch 107 using a protocol such as SNMP.

FIG. 5 is a diagram showing an example of the system profile table stored in the prediction server 113.

The concept of a monitored system was described above. To translate this concept into a concrete object, a system profile table 410 is prepared for use in the failure prediction function of the system monitoring service. The system profile table 410 includes a system ID field, a system name field, and an arbitrary number of measured metrics fields. One record corresponds to one monitored system. The system ID field stores a unique symbol, and the system name field stores a name that was assigned so that the administrator can identify the monitored system. In addition, the measured metrics collected by the monitoring apparatus from the apparatuses configuring a certain monitored system are assigned a name so that they can each be differentiated, and stored as the measured metrics field in the system profile table. Thus, the number of measured metrics fields that are used will differ depending on the record. In this embodiment, the name of the measured metrics is generated and assigned based on the name of the production server and the type of measured metrics, but without limitation thereto, any method of naming may be used so as long as it is possible to ensure the uniqueness without interfering with the smooth execution of the respective processing included in this embodiment.

Moreover, the system profile table 410 stores, in the measured metrics field, the performance metrics of the distributed application pertaining to the execution by the monitored system. This performance metric is, for example, in the case of a Web application, an index that is indicated as a numerical value such as the number of concurrent users per unit time, or an average response time. Similar to the measured metrics, a name capable of differentiating each of the performance metrics is assigned to each performance metric. For example, the name of the performance metric may be generated based on the name of the distributed application and the type of metric.

While the system profile table 410 is typically stored in the memory of the prediction server 113, without limitation thereto, the system profile table 410 may also be stored in a storage, or stored in another server and acquired via communication as needed. Moreover, while this embodiment adopts a format of a table for facilitating the explanation of the present invention, other data structures such as a key value format or a document oriented database may also be adopted.

The respective records of the system profile table 410 are created, for example, by using the information that was input by the administrator of the customer site.

FIG. 6 is a diagram showing an example of the concatenated measured metrics.

It was previously described that the measured values collected by the monitoring apparatus include the acquisition time thereof. By using the acquisition time, records that have a common acquisition time can be extracted and concatenated from the measured values that were collected from a plurality of apparatuses including the monitored system. An example of a table which concatenates the measured metrics collected from a plurality of production servers of a certain monitored system in the manner described above is shown as a table 403 of FIG. 6(*a*). The respective fields of the table 403 are each assigned a name, for differentiating the fields, which is stored in the measured metrics field of the system profile table.

In addition, the performance metrics of the distributed application pertaining to the execution by the monitored system can similarly be concatenated. This kind of example is shown as a table 404 of FIG. 6(*b*). The field group 405 stores the performance metrics of the distributed application pertaining to the execution by a certain monitored system, and the field group 406 stores the measured metrics collected from the production server of that monitored system. The method of collecting these performance metrics will be described later.

While the foregoing concatenation processing may be performed by any apparatus such as the monitoring apparatus, the storage server, or the prediction server, the concatenated measured metrics are stored in the storage of the storage server.

Figure 7:
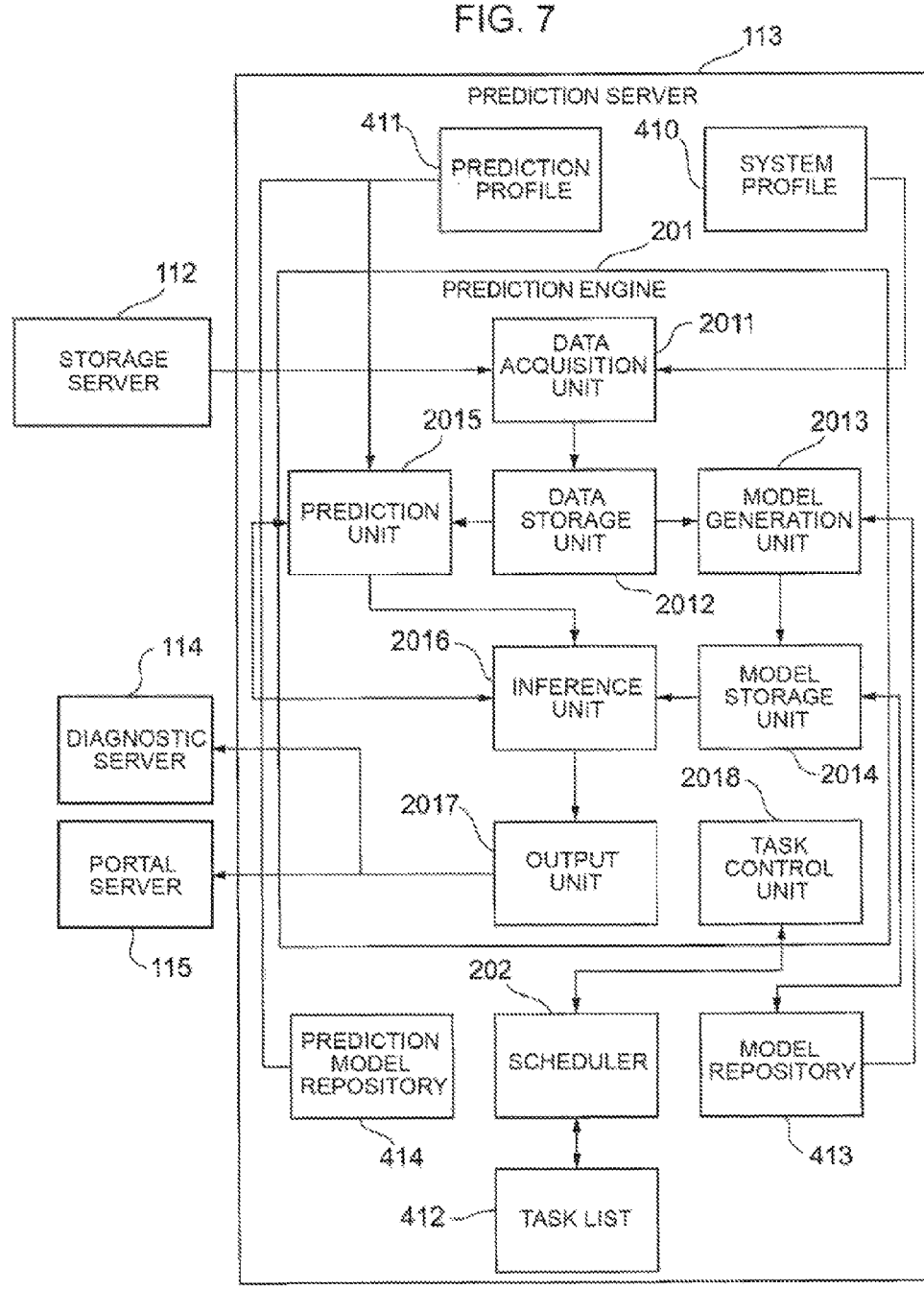
FIG. 7 is a block diagram showing an example of the configuration of the prediction server.

FIG. 7 is a diagram showing an example of the configuration of the prediction server.

The prediction server 113 is equipped with a prediction engine 201 as a user process. This kind of user process is generated by the processor executing the prediction engine program stored in the storage. The prediction engine includes a data acquisition unit 2011, a data storage unit 2012, a model generation unit 2013, a model storage unit 2014, a prediction unit 2015, an inference unit 2016, an output unit 2017, and a task control unit 2018. Moreover, the prediction server 113 is equipped with a scheduler 202 as a user process. Note that the scheduler 202 may also be a user process that is generated by the prediction engine program, or a user process that is generated by other programs. In addition, as described above, the memory of the prediction server 113 stores a system profile table 410, a prediction profile table 411, a task list table 412, a model repository 413, and a prediction model repository 414. Note that the foregoing information may be stored in the storage in substitute for the memory, or stored in another server and acquired via communication as needed.

The respective components of the prediction engine 201 are now explained. Note that the substance of the respective components may be a program function, a program module, a library, a class instance or the like, or other substances. In addition, so as long as the processing provided by the respective components can be achieved, the respective components do not need to be clearly differentiated as programs or user processes, and it will suffice so as long as the processing provided by the respective components can be performed independently by the prediction engine program or jointly with an OS or other programs.

The data acquisition unit 2011 of the prediction engine 201 requests the storage server to send a measured value, receives the measured value, and stores the measured value in the data storage unit 2012. The model generation unit 2013 generates a system model based on the measured values stored in the data storage unit, and stores the system model in the model storage unit 2014. The prediction unit 2015 executes the time series prediction processing based on the measured values stored in the data storage unit, the information stored in the prediction profile table 411, and the information stored in the prediction model repository 414, and notifies the obtained predicted value to the inference unit 2016. The inference unit 2016 executes the probability inference processing based on the received predicted value, the system model stored in the model storage unit, and the information stored in the prediction profile table, and notifies the obtained probability value to the output unit 2017.

The output unit 2017 sends the received probability value to the diagnostic server 114 and the portal server 115. The task control unit 2018 receives the task message from the scheduler 202, and executes the task and cancels the task by controlling the processing execution of the foregoing processing unit configuring the prediction engine according to the contents of the task message. The foregoing processing executed by the prediction server is hereinafter referred to as the failure prediction processing.

When the output unit 2017 is to send the probability value to the diagnostic server and the portal server, such sending does not necessarily have to be performed in synchronization with the failure prediction processing, and the probability value may also be stored in a memory or a storage, and sent according to the presentation request of information.

The scheduler 202 acquires a list of the failure prediction processing to be executed by the prediction engine from the task list table 412, sends and receives a task message to and from the prediction engine, and updates the task list table according to the task execution status. The task list table 412 stores the list of the failure prediction processing that is executed by the prediction engine.

The prediction profile table 411 and the task list table 412, and the processing of the scheduler 202, the task control unit 2018, the model generation unit 2013, the prediction unit 2015, and the inference unit 2016, which constitute the core of the failure prediction processing that is executed by the prediction server, are now explained.

FIG. 8 is a diagram showing an example of the prediction profile table.

The prediction profile table 411 stores the definition of the failure prediction processing to be executed by the prediction engine. The respective records of the prediction profile table store one failure prediction processing, and are uniquely identified with the prediction profile ID field. The system name field stores any one of the system names recorded in the system profile table. Otherwise, the prediction profile table 411 may also store the system ID. The model ID field stores the ID of the system model that is used in the probability inference processing, and the prediction model ID field stores the ID of the prediction model that is used in the time series prediction processing. The default lead time field stores the value that is used in the time series prediction processing, and the reference index field, the target index field and the predicted event field respectively store the values that are used in the probability inference processing. The method of using these IDs and values will be described later.

The respective records of the prediction profile table 411 are created by using the information that was input, for example, by the administrator of the customer site. An example thereof will be described later.

Figure 9:
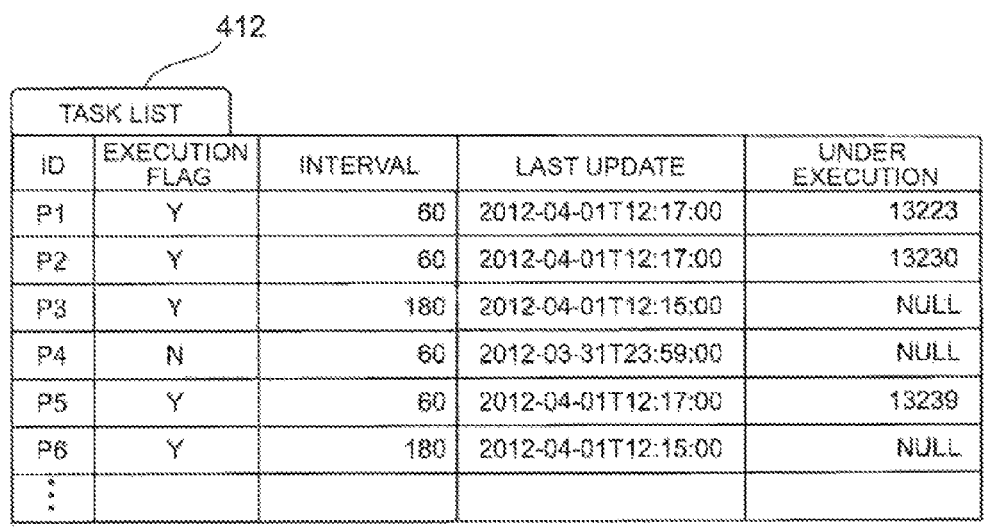
FIG. 9 is a task list table.

FIG. 9 is a diagram showing an example of the task list table.

While the prediction profile table 411 defined the failure prediction processing, the task list table 412 is a table for managing the execution status of each processing. As long as the monitored system is used for executing the distributed application, the internal status thereof will continue to change every moment, and as long as the risk that a failure will occur will also change, the failure prediction processing also needs to be continuously executed, and the task list table exists for the management thereof. In the ensuing explanation, the failure prediction processing stored in the task list table is sometimes referred to as a task.

The respective records of the task list table store one failure prediction processing, and the correspondence relation thereof with the prediction profile table is set forth with the prediction profile ID stored in the ID field. The execution flag field stores a flag indicating whether to periodically execute the failure prediction processing stored in the record. When the flag is "Y", the failure prediction processing is periodically executed, and when the flag is "N", the failure prediction processing is not periodically executed. The interval field stores the numerical value indicating the execution interval upon periodically executing the failure prediction processing, which typically uses second as the unit of time. The last update field stores the time that the execution of the failure prediction processing of the respective records was last started. The active field stores an ID which is capable of uniquely identifying the active task (TID), and stores NULL when there is no active task.

Among the respective records of the task list table 412, the records other than the last update field and the active field are created, for example, by using the information input by the administrator of the customer site.

Figure 10:
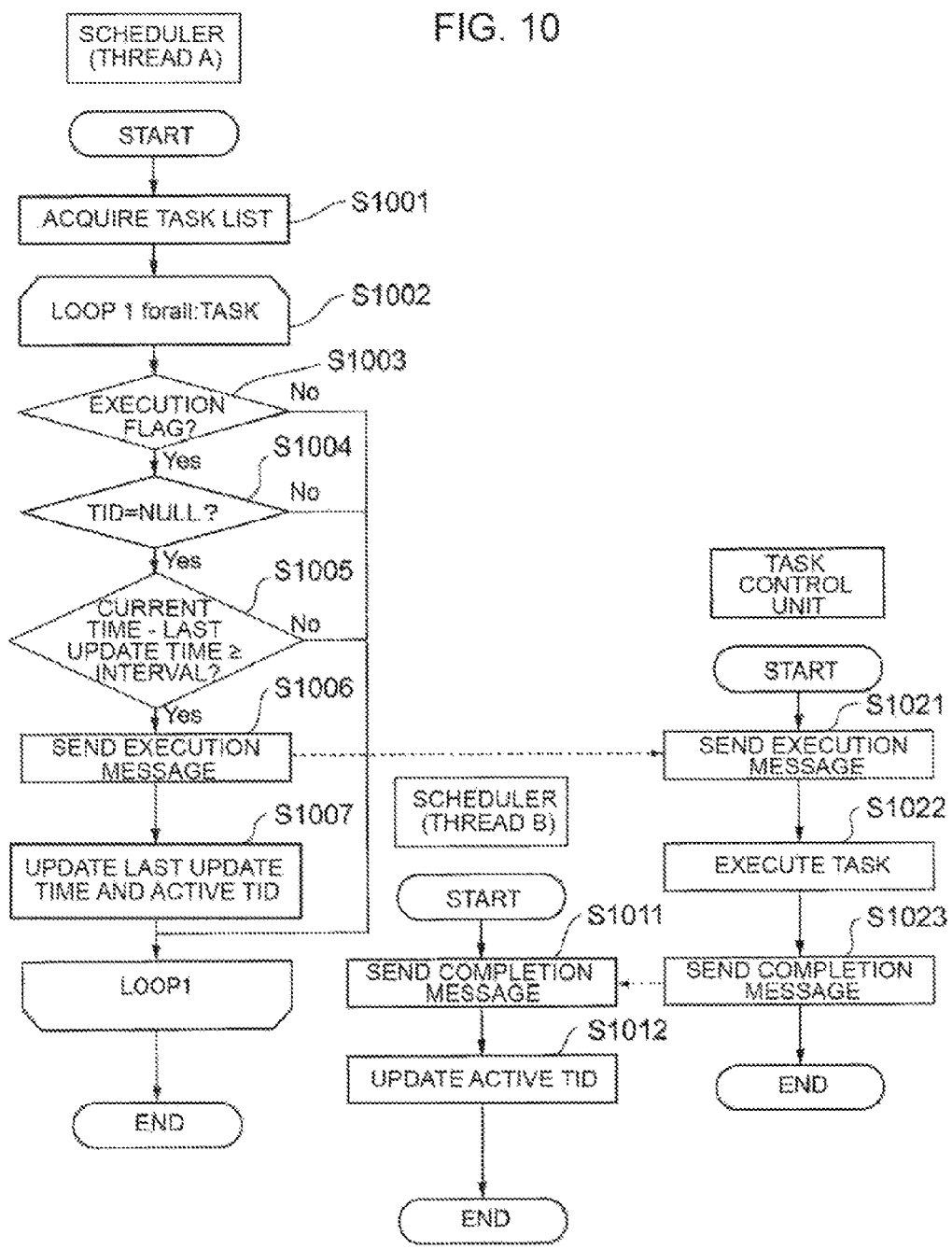
FIG. 10 is a flowchart showing an example of the operation of the scheduler and the prediction engine.

FIG. 10 is a diagram showing an example of the processing routine of the scheduler and the prediction engine.

The scheduler confirms the start of execution and the end of execution with regard to the respective failure prediction processing stored in the task list table. In this embodiment, while the scheduler is configured to perform parallel processing by using a thread mechanism, it is also possible to adopt a configuration based on a multi process, or otherwise adopt a parallel processing mechanism or an asynchronous processing mechanism.

Foremost, the thread A of the scheduler acquires the task list (step S1001). In the following processing, processing is performed to all tasks recorded in the task list (step S1002). The thread A foremost determines whether "Y" is stored in the execution flag field (step S1003). Next, the thread A determines whether the active field is NULL (step S1004). Subsequently, the thread A determines whether the difference between the current time and the last update time is not less than the interval (step S1005). When a positive result is obtained in the foregoing determinations, since the task can be executed and is in a non-executed state beyond the interval from the previous execution time, the thread A sends the task execution message (step S1006), and updates the last update time of the task list to the current time, and updates the TID that created the active field (step S1007). The thread A can instruct the prediction engine to continuously execute the failure prediction processing by periodically executing the series of processing described above.

The task control unit of the prediction engine is constantly in a reception standby state of the execution message. Upon receiving the execution message sent by the scheduler (step S1021), the tasks are executed by instructing the respective processing units in the prediction engine to perform the processing based on the tasks stored in the execution message (step S1022). When the execution of the task is complete, the thread A sends a completion message (step S1023), and returns to the execution message reception standby state.

The thread B of the scheduler is constantly in a completion message reception standby state. Upon receiving the completion message sent by the task control unit (step S1011), the thread B updates the active field of the record corresponding to the task in the task list to NULL (step S1012).

The exchange of message between the scheduler and the task control unit in the prediction engine may be performed via an arbitrary inter-process communication method such as HTTP, RPC, or message queue.

Figure 11:
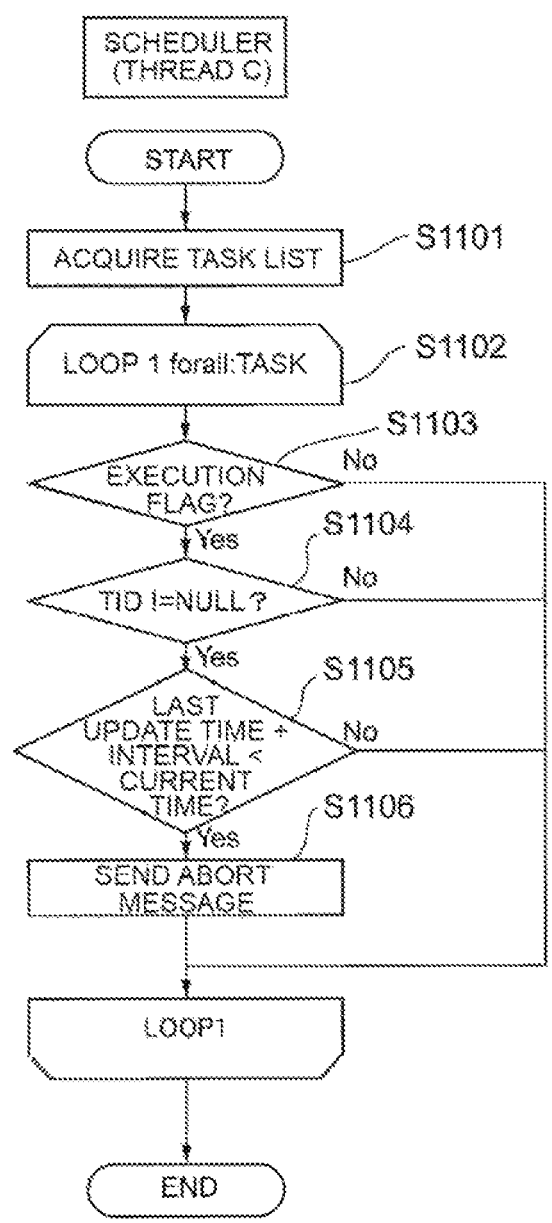
FIG. 11 is a flowchart showing an example of the operation of the cancellation processing performed by the scheduler.

FIG. 11 is a diagram showing an example of the processing routine of cancelling the task that is being executed by the prediction engine.

Depending on the task that is executed by the prediction engine, there may be a task that remains active even after the lapse of the interval from the time that the execution was started due to some kind of factor. Since the processing result of this kind of task will be late even if it is output normally, it is desirable to cancel the processing to prevent the consumption of computational resources.

In this embodiment, the thread C of the scheduler performs the task abort processing. Foremost, the thread C acquires the task list (step S1101). The following processing is performed to all tasks recorded in the task list (step S1102). The thread C foremost determines whether "Y" is stored in the execution flag field (step S1103). Next, the thread C determines whether the active field is NULL (step S1104). Subsequently, the thread C determines whether the sum of the last update time and the interval is smaller than the current time (step S1105). When a positive result is obtained in the foregoing determinations, since the task is active and the default interval has elapsed from the time of the previous execution, the thread C sends an abort message of that task to the task processing unit of the prediction engine (step S1106). The thread C can thereby prevent the task of the prediction engine from consuming the computational resource by periodically executing the series of processing described above.

Figure 12:
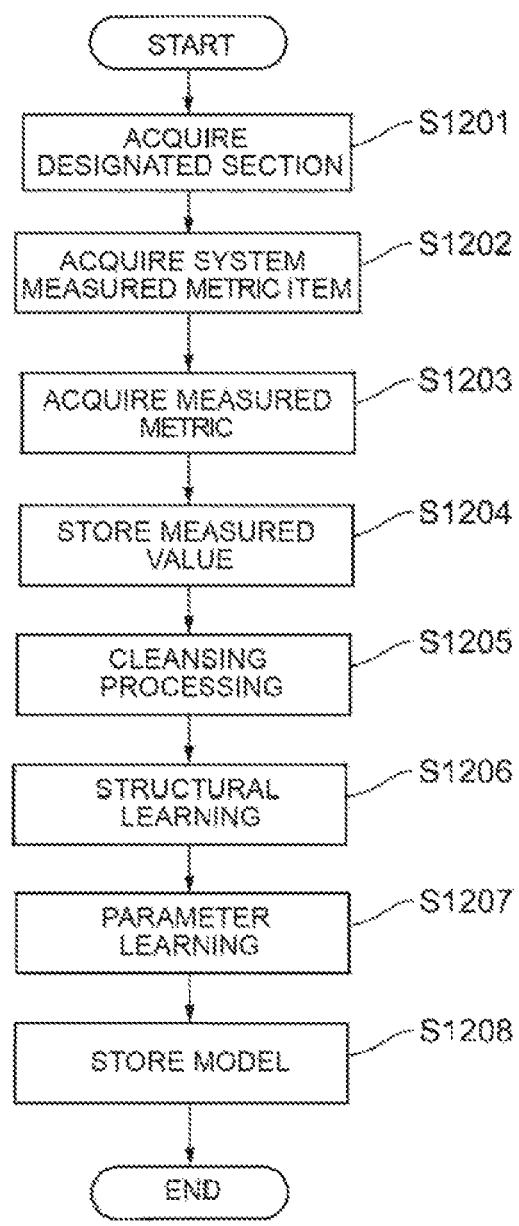
FIG. 12(*a*) is a flowchart showing an example of the operation of the system model generation processing.
Figure 12:
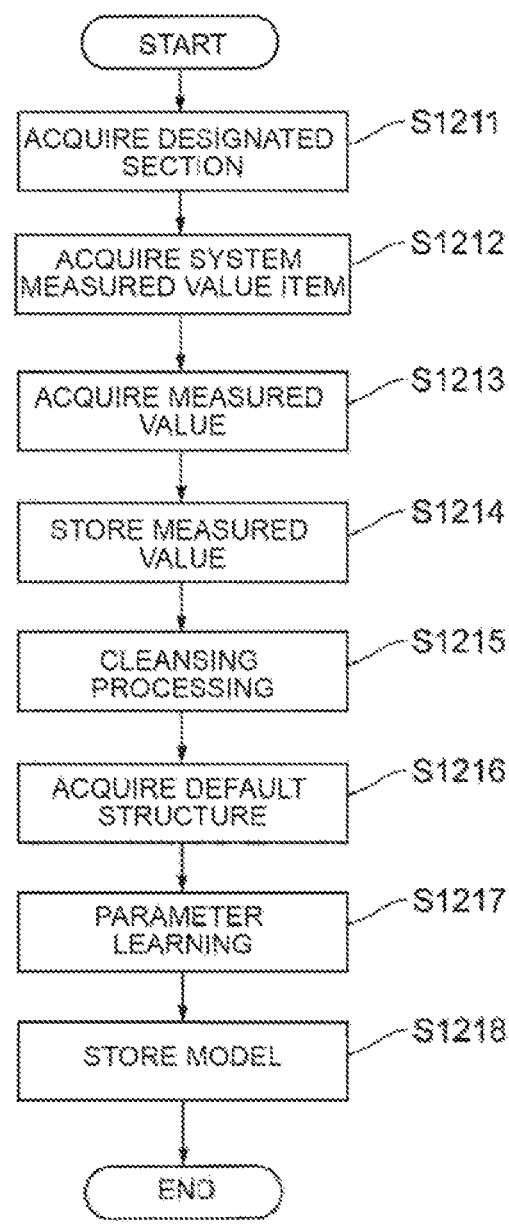

FIG. 12 is a diagram showing an example of the processing routine of the system model generation that is performed by the prediction engine 201.

The system model of the monitored system is required for the failure prediction processing. This system model is a statistical model describing the mutual relation between the measured metrics and the performance metrics based on the data of the specific numerical values like the table 404 shown in FIG. 6(b) with regard to the measured metrics and performance metrics pertaining to the monitored system that are recorded in the system profile table 410. As this kind of model, for example, the Bayesian network can be adopted.

The Bayesian network is a probabilistic model that is configured from a directed acyclic graph that uses a plurality of random variables as the nodes, and conditional probability tables or conditional probability density functions of the respective variables based on the dependency between the nodes represented by the graph, and can be created based on statistical learning. In particular, to use the observed data of a variable and determining the structure of a directed acyclic graph is referred to as structural learning, and the generation of parameters of the conditional probability table or the conditional probability density function of the respective nodes of the graph is referred to as parameter learning.

In this embodiment, the model generation unit 2013 and the model storage unit 2014 of the prediction engine 201 perform the system model generation processing. The system model generation processing is typically executed by the task control unit with the reception of the model generation message as the trigger. This message includes a system name or a system ID of the monitored system as the target of model generation, and a designated section indicating the temporal range of the measured values used in the model generation.

FIG. 12(*a*) shows the processing routine of the system model generation that performs both the structural learning and the parameter learning.

The model generation unit acquires the designated section from the model generation message (step S1201). Subsequently, the model generation unit acquires the items of the measured metrics of the monitored system recorded in the system profile table (step S1202). The model generation unit acquires the measured values corresponding to the range of the designated section from the data storage unit regarding the items of the measured metrics (step S1203). The model generation unit stores the acquired measured values in the memory (step S1204), and then performs cleansing processing (step S1205). The cleansing processing may be performed by using methods that are generally known as statistical processing targeting observed data such as the deletion of outlier, interpolation of missing values, or normalization, or a combination of such methods. With the measured values that was subject to cleansing processing as the learning data, the structural learning is executed (step S1206), and, with the measured values similarly as the learning data, the parameter learning is performed to the generated graph structure (step S1207). As the algorithm of the structural learning, the Hill-Climbing method, the Grow-Shrink method and the like are known, and as the algorithm of the parameter learning, the maximum likelihood estimation method, the Bayesian estimation method and the like are known, and an appropriate type of method may be arbitrarily selected. Subsequently, the model storage unit stores, in the model repository 413, the system model generated by the model generation unit (step S1208).

FIG. 12(*b*) shows the processing routine of the system model generation that only performs the parameter learning relative to the graph structure that has been previously stored in the model repository.

The processing from the acquisition of the designated section by the model generation unit from the model generation message (step S1211) to the cleansing processing (step S1215) is the same as the processing shown in FIG. 12(*a*). The model generation unit obtains the measured values that were subject to cleansing processing, and thereafter requests the system model of the monitored system to the model storage unit. The model storage unit acquires the system model stored in the model repository, and the model generation unit acquires the graph structure from the system model (step S1216). Subsequently, the parameter learning is performed with the measured data that was subject to cleansing processing was the learning data (step S1217). The model storage unit stores the thus updated system model in the model repository (step S1218).

The processing load required for the structural learning can be reduced based on the foregoing system model generation processing through the parameter learning that uses the known graph structure.

Figure 13:
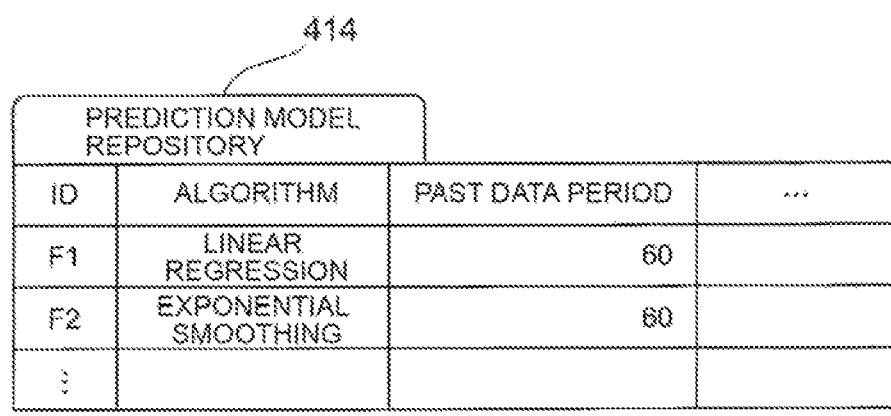
FIG. 13(*a*) is a diagram showing an example of the model repository.

FIG. 13 is a diagram showing an example of the model repository.

The model repository 413 shown in FIG. 13(*a*) records the system model that was generated as a result of the prediction engine performing the system model generation processing. The respective models can be uniquely identified based on the ID field, and the administrator can assign a model name so that the respective models can be easily differentiated. An example of displaying the model name will be described later.

It was described above that the system model is configured from a graph structure that is generated based on the structural learning, and parameters that are generated based on the parameter learning. The structure field of the model repository stores the graph structure that is generated based on the structural learning. The parameter field stores the parameters of the conditional probability tables or the conditional probability density functions that were generated based on the parameter learning.

However, the graph structure or parameters may exist in the memory in a format that is not suitable for direct storage in a table. In the foregoing case, the table may store a pointer to the graph structure or parameters. While this embodiment adopts a table format for facilitating the explanation of the present invention, an object database, a graph database, or other data structures may also be adopted. Moreover, it is also possible to use the function of a separately prepared content repository or configuration management tool, or they may be simply stored in a file system. Whatever the mode, a configuration in which the graph structure of the system model can be acquired independently from the parameters is desirable.

The prediction model repository shown in FIG. 13(*b*) records the prediction model that is used in the time series prediction processing described later. The respective models can be uniquely identified based on the ID field. The algorithm field records the algorithm that is used for building a time series prediction model, and the past data period field records the temporal range of the past data that is used in the time series prediction processing. Moreover, the prediction model repository can also record the parameters that are required for building the time series prediction model.

Figure 14:
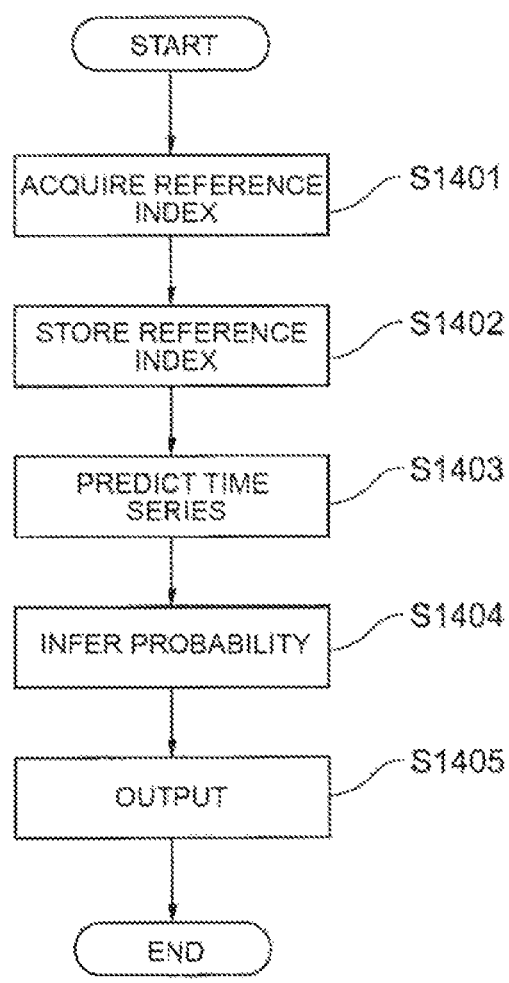
FIG. 14(*a*) is a flowchart showing an example of the outline of the operation of the failure prediction processing.
Figure 14:
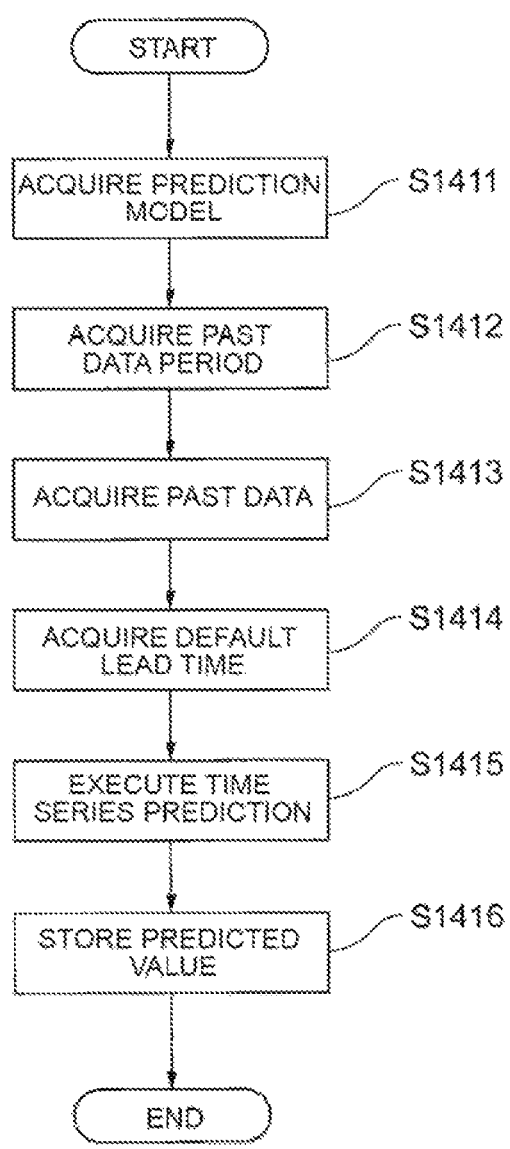
Figure 14:
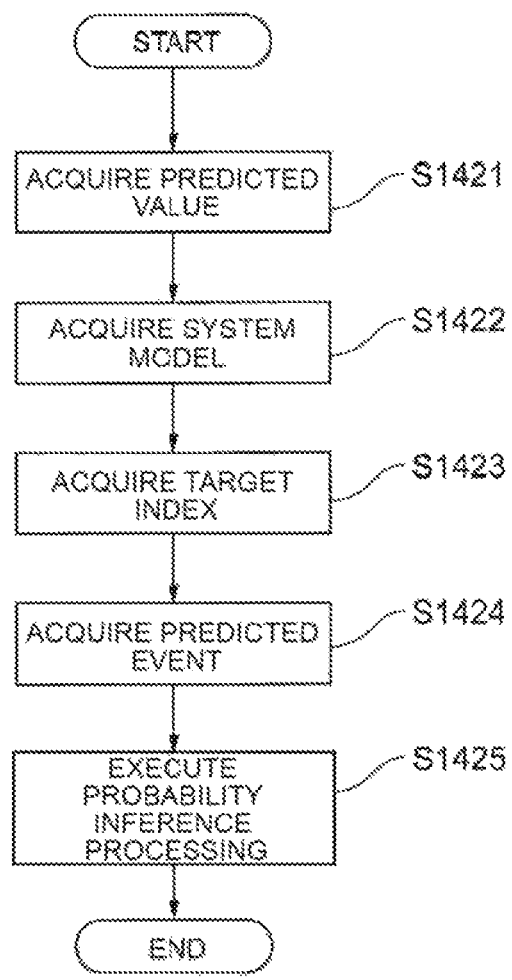

FIG. 14 is a diagram showing an example of the processing routine of the failure prediction that is performed by the prediction engine 201.

In this embodiment, the system model is represented with a probabilistic model based on the Bayesian network. With the Bayesian network, when a value of a certain node is observed, it is possible to obtain the probability that the other nodes will take on a certain value. This type of processing is referred to as probability inference. The respective nodes configuring the Bayesian network of this embodiment are the measured metrics, performance metrics of the distributed application collected from the production server configuring the monitored system. Thus, if an actual value of a certain measured metrics or a performance metrics can be obtained, it is possible to obtain the probability that the other measured metrics or performance metrics will take on a certain value based on probability inference.

Upon applying this characteristic to the failure prediction, this embodiment concurrently uses time series prediction. Generally speaking, time series prediction is the technique of building a model from the data (time series data) obtained by observing the diachronic changes of a certain variable, and predicting the future value of the variable based on the created model. As a method of model building to be applied to the foregoing technique, for instance, linear regression, exponential smoothing, ARIMA model and the like are known.

The outline of the failure prediction method of this embodiment is to foremost obtain the future value of a certain performance metrics based on time series prediction, and subsequently perform probability inference based on the Bayesian network with that value as the input.

FIG. 14(a) shows an example of the processing routine of this method. This processing is started with the reception of the execution message by the task control unit 2018 as the trigger. Foremost, the prediction unit 2015 acquires, from the data storage unit 2012, the reference index stored in the prediction profile table 411 (step S1401), and stores the reference index in the memory (step S1402). Subsequently, the prediction unit 2015 performs the time series prediction processing according to the prediction model and the default lead time similarly recorded in the prediction profile table (step S1403). Subsequently, the prediction unit 2015 performs probability inference according to the predicted value obtained from the time series prediction, and the system model, the target index and the predicted event stored in the prediction profile table (step S1404). Finally, the prediction unit 2015 outputs the probability obtained from the probability inference (step S1405).

FIG. 14(b) shows, in further detail, the processing routine of the time series prediction corresponding to step S1403 of FIG. 14(a). Foremost, the prediction unit acquires the prediction model ID recorded in the prediction profile table, and obtains, from the prediction model repository 414, the corresponding algorithm and the parameters required for the time series prediction processing in accordance with that ID (step S1411). Subsequently, the prediction unit similarly acquires the past data period from the prediction model repository (step S1412). The prediction unit acquires the measured values that correspond to the reference index in the amount of the acquired past data period (step S1413). Subsequently, the prediction unit acquires the default lead time from the prediction profile table (step S1414). The term "default lead time" refers to the value indicating what value the predicted value obtained in the time series prediction processing should be set as; specifically, the value of how many seconds after the final point of the past data. The prediction unit executes the time series prediction processing by using the algorithm of the time series prediction, parameters, measured values and default lead time obtained in the foregoing steps (step S1415). The predicted value obtained as a result of the processing is stored in the memory (step S1416).

FIG. 14(c) shows, in further detail, the processing routine of the probability inference corresponding to step S1404 of FIG. 14(a). Foremost, the inference unit acquires the predicted value stored in the memory (step S1421). Next, the inference unit acquires the model ID recorded in the prediction profile table, and acquires the system model from the model repository according to that ID (step S1422). Subsequently, the inference unit similarly acquires the target index (step S1423), and the predicted event (step S1424) from the prediction profile table. The target index corresponds to the node for which the probability is to be obtained in the probability inference of the Bayesian network, and the predicted event is information describing the condition regarding which value or range of values the target index will take upon obtaining the probability, and is typically a condition of exceeding a value as a threshold. For example, when the target index is the average response time of the distributed application, the target index exceeding 3000 milliseconds is represented as a predicted event of "T>3000". Subsequently, the inference unit executes the probability inference processing by using the predicted value, system model, target index and predicted event obtained in the foregoing steps (step S1425).

Figure 15:
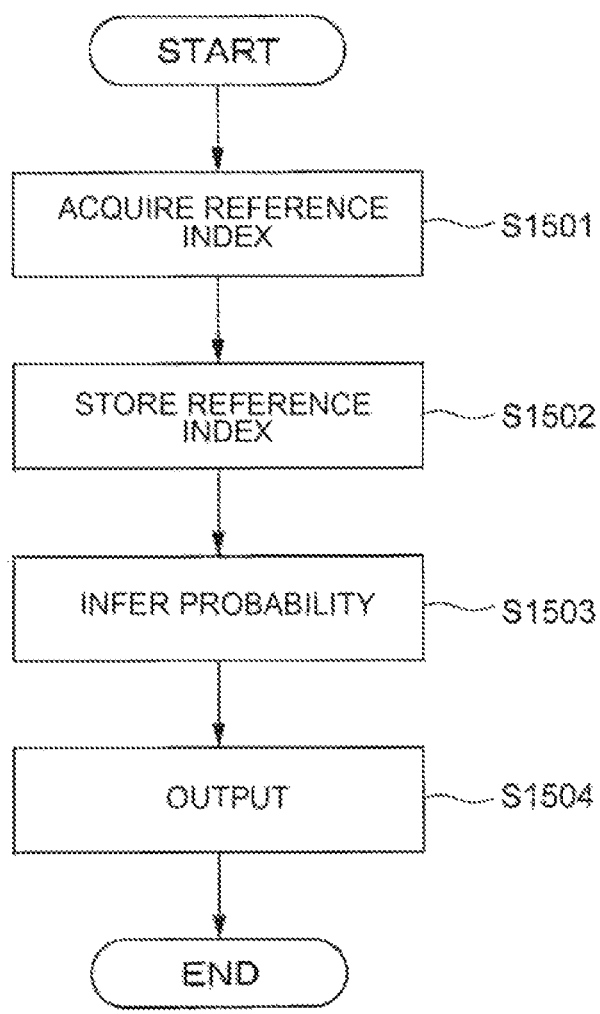
FIG. 15(*a*) is a flowchart showing another example of the outline of the operation of the failure prediction processing.

FIG. 15 is a diagram showing another example of the processing routine of the failure prediction that is performed by the prediction engine 201.

FIG. 14 shows the processing routine of using the time series prediction and the probability inference together. The Bayesian network adopted as the system model is also known as the causal network, and can thus also represent the structure of the causal relationship between the observed data corresponding to the respective nodes. The processing routine shown in FIG. 15 utilizes this characteristic. In other words, the processing of time series prediction is omitted, and the probability inference is performed based on the system model with the acquired reference index as the input.

FIG. 15(a) shows an example of the processing routine of this method. Other than excluding the time series prediction step (step S1403) from the processing routine shown in FIG. 14(a), the processing routine is the same and the difference is that the probability inference is performed (step S1503) using the reference index stored in the memory in step S1502 in substitute for the predicted value.

FIG. 15(b) shows, in further detail, the processing routine of the probability inference corresponding to step S1503 of FIG. 15(a). FIG. 15(b) is also the same as the processing routine shown in FIG. 14(c) other than excluding the step (step S1421) of acquiring the predicted value based on the time series prediction from the processing routine of FIG. 14(c).

Figure 16:
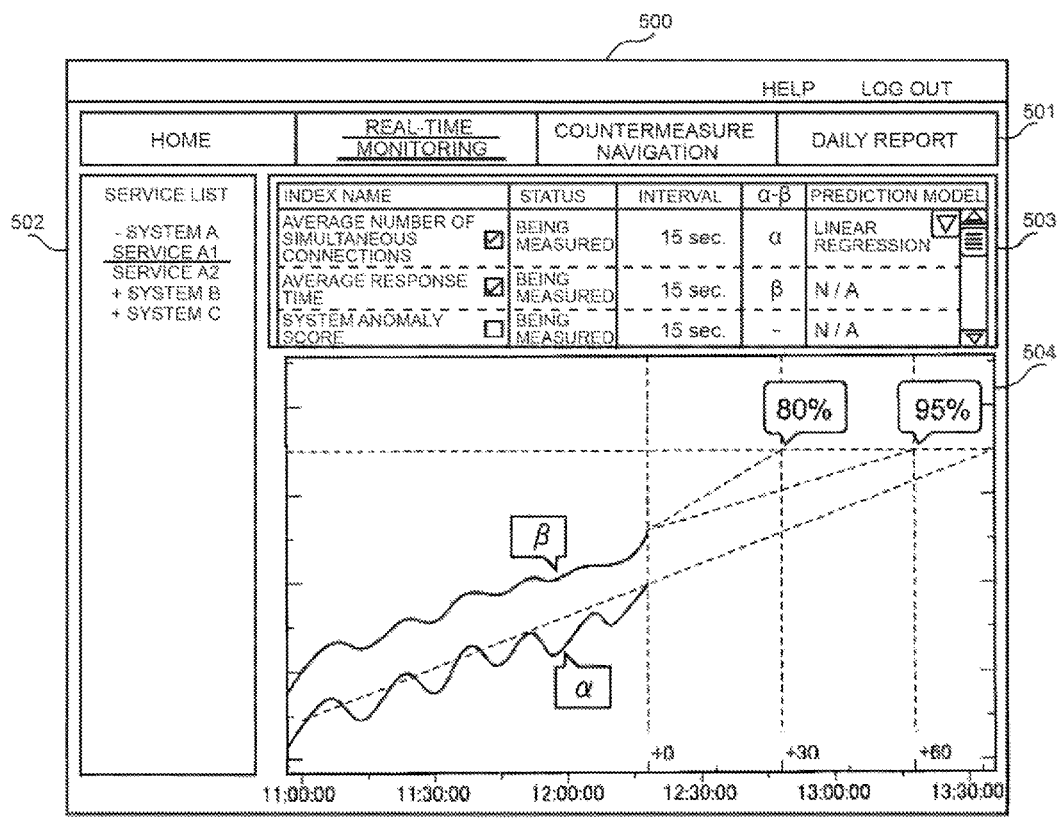
FIG. 16 is a layout diagram showing an example of the client screen that is set to display the failure prediction result.

FIG. 16 is a diagram showing an example of the screen that is set to display the failure prediction result.

Based on the failure prediction processing explained above, the occurrence probability of the predicted event output by the prediction server 113 is sent to the portal server 115, and the portal server additionally sends the occurrence probability to the monitoring client 116. The Web browser 212 loaded in the monitoring client conveys the probability to the administrator of the customer site 301 by displaying, for example, a screen as show in FIG. 16.

The Web browser loaded in the monitoring client displays a client screen 500 on the console 105. The client screen 500 includes a function menu 501, a system list 502, an index list 503, and a plot area 504. The function menu 501 has a plurality of buttons, and includes, for example, a "real-time monitoring" button. The system list 502 typically displays the monitored system and distributed application of the customer site as a list in the form of a hierarchical structure, and displays that a specific item among the items displayed as a list has been selected in correspondence with the information input by the administrator. In order to differentiate the selected item from the other items, means for underlining the selected item or changing the font or background color to be different from the surrounding may also be used. The index list 503 displays a list of the measured metrics and performance metrics to be collected by the monitored system corresponding to the selected item, and additionally displays which measured metrics and performance metrics among the above have been selected to be displayed in the plot area 504.

The index list 503 is now explained in detail. The index list is displayed as a table, and includes an index name field 5031, a status field 5032, an interval field 5033, a warning sign field 5034, and a prediction model field 5035.

The index name field records the names of the measured metrics and performance metrics to be collected by the monitored system and displays them as a list, and the respective records have a check box. The name may be the name stored in the system profile table, or converted into a name that can be instinctively comprehended by the administrator and then displayed. When the check box becomes selected according to the administrator's input, the past data of the measured metrics or the performance metrics of the record of that check box is plotted as a time series on the left half of the plot area 504.

The status field displays whether the measured metrics or the performance metrics corresponding to the respective records has been accumulated in the storage server 112 as a result of being collected by the monitoring apparatus 111. The interval field displays the setting value of the interval of collecting the measured metrics or the performance metrics. For example, as shown in FIG. 4, when a collection interval is assigned to the measured value, that value may be used.

The warning sign field displays, among the measured metrics and the performance metrics, an "α" symbol as the index that is being used as the reference index and a "β" symbol as the index that is being used as the target index in the foregoing failure prediction processing. These symbols have been adopted as examples to prevent the contents displayed on the client screen from becoming complicated, and may be arbitrarily selected. Moreover, a pair of the α-β symbol is not limited to one pair for each index list.

The prediction model field displays the name of the prediction model, which is used by the index corresponding to the record to which the α symbol is assigned, in the time series prediction of the failure prediction. As the name, the name stored in the prediction model repository 414 may be used.

The plot area 504 displays the time series plot, for instance, in which the transition of time is set from the left direction to the right direction of the horizontal axis. A measured metrics or a performance metrics corresponding to a record in which the check box of the index name field of the index list is selected is plotted on the left side of the boundary line at substantially the center of the plot area. Moreover, set on either the left or right of the vertical axis is a scale that is suitable for at least displaying the index set as the target index, and the value that is set as the threshold in the predicted event field of the prediction profile table is displayed as the horizontal line. On the right side of the boundary line, displayed is the probability of outputting, as the processing result of the task, the processing pertaining to the monitored system or the distributed application that is selected in the system list 502 among the respective failure prediction processing stored in the prediction profile table. Typically, with the position of the boundary line as the current point in time, a vertical line is displayed at a location that is separated rightward at a distance corresponding to the default lead time of the failure prediction processing, and the probability is displayed near the intersection with the horizontal line indicating the threshold. Moreover, similarly on the right side of the boundary line, displayed is the predicted value obtained in the time series prediction processing of the task. Typically, for example, when adopting linear regression for building the prediction model, by displaying the intersection of the plot line corresponding to the reference index and the boundary line, and the segment passing through the predicted values, it is possible to represent that the predicted value was calculated based on the time series prediction from the measured value as the reference index.

With the plot area, the contents to be displayed can be changed in various opportunities such as according to the internal of the measured value shown in FIG. 4, or according to the interval of the task list table shown in FIG. 9, or with the timing that the information to be displayed can be sent from the portal server as the trigger. Otherwise, the configuration may also be such that the display contents are updated according to the administrators input, or the update of the display contents may be performed at an arbitrary timing or interval. Moreover, the update of the display contents does not need to be performed by synchronizing the overall client screen, and the display contents may also be partially updated.

Figure 17:
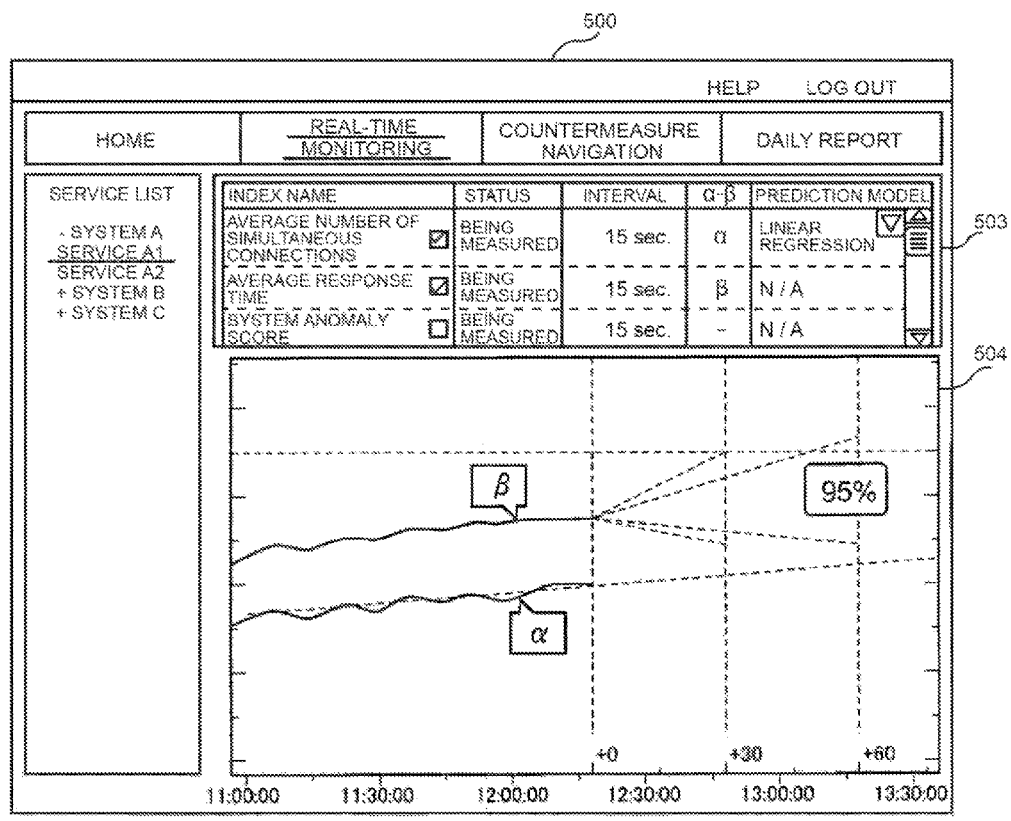
FIG. 17 is a layout diagram showing another example of the client screen that is set to display the failure prediction result.

FIG. 17 is a diagram showing another example of the screen that is set to display the failure prediction result.

The client screen shown in FIG. 16 displayed the processing result in the predicted event field of the prediction profile table regarding the failure prediction processing that was set to obtain the probability that the target index would exceed a certain threshold. FIG. 17 shows a client screen of displaying the processing result, as a different predicted event than FIG. 16, regarding the failure prediction processing that was set to obtain the probability that the target index is within a specific range represented with upper/lower limits.

The plot area 504 displays a vertical line at a location separated rightward at a distance corresponding to the default lead time of the failure prediction processing with the position of the boundary line as the current point in time. In addition, the plot area 504 displays dotted lines respectively connecting the two points corresponding to the upper/lower limits by deeming the vertical line to be the vertical axis, and the intersections of the plot line and the boundary line displayed based on the time series plot of the target index, and displays the probability nearby. These dotted lines are displayed for enabling the administrator to easily comprehend the upper/lower limits, and a suitable, arbitrary method for achieving this objective may be adopted. The other portions of the client screen are the same as the example shown in FIG. 16.

Figure 18:
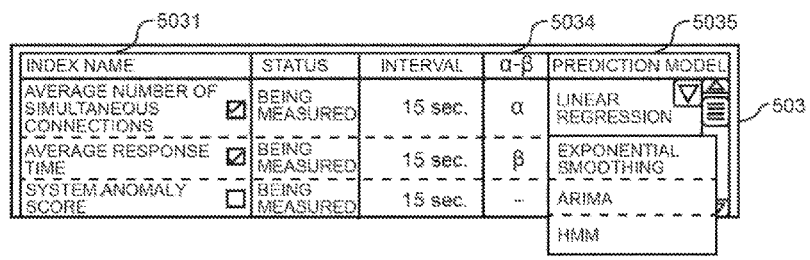
FIG. 18 is a layout diagram showing an example of the list of metrics which enables the selection of the prediction model.

FIG. 18 is a diagram showing an example of the screen for selecting the prediction model.

The prediction model used in the time series prediction of the failure prediction processing can be respectively set for each failure prediction processing stored in the prediction profile table. The prediction model field is configured, for example, as a drop-down list with regard to the record that is the reference index in the index list so that the administrator can perform the foregoing setting.

FIG. 18 shows an example in which the prediction model field 5035 is selectable as a drop-down list regarding the record in which the warning sign field 5034 in the index list 503 is displaying "α". The drop-down list can be displayed such that the respective prediction models recorded in the prediction model repository 414 as an option. Moreover, so long as it is a prediction model that can be used by the prediction unit 2015 of the prediction engine, arbitrary prediction models can be combined and displayed as options.

FIG. 19 is a diagram showing an example of the screen for selecting the system model.

The model repository 413 may include a plurality of models of a certain monitored system. Thus, the model repository 413 provides means for enabling the administrator to designate, from the monitoring client 116, regarding which model ID is to be stored in the model ID field of the prediction profile table 411. The system model can be selected, for example, by the administrator selecting and pressing the "home" button of the function menu 501, and displaying the setting menu 505 with the management target system being selected in the system list 502 as the trigger.

FIG. 19(a) shows the screen for selecting the system model of the monitored system.

The client screen 500 has a setting menu 505. The setting menu includes a "configuration setting" button, and when the administrator selects and presses that button, the client screen displays the configuration setting frame 506. The configuration setting frame includes a used model field 5061, a used model designation drop-down list 5062, and a model registration button 5063. The used model field displays the name of the system model that is used as a default in the failure prediction processing of the monitored system in a selectable state in the system list. When the administrator presses the button of the used model field, the client screen displays the used model designation drop-down list 5062. The used model designation drop-down list displays, as a list, the model name of the system model of the monitored system stored in the model repository. The selected system model is displayed in the used model field with the administrator selecting one from that list as the trigger. Thereafter, the selected system model is set as the system model to be used as a default when, for example, the administrator selects and presses the OK button (not shown) as the trigger.

When the administrator selects and presses the model registration button 5063, for example, the file selection dialog (not shown) is displayed, and it is possible to urge the administrator to upload a file including information corresponding to the system model in the prediction server. The uploaded system model is stored in the model repository, and is included in the used model designation drop-down list.

Figure 19B:
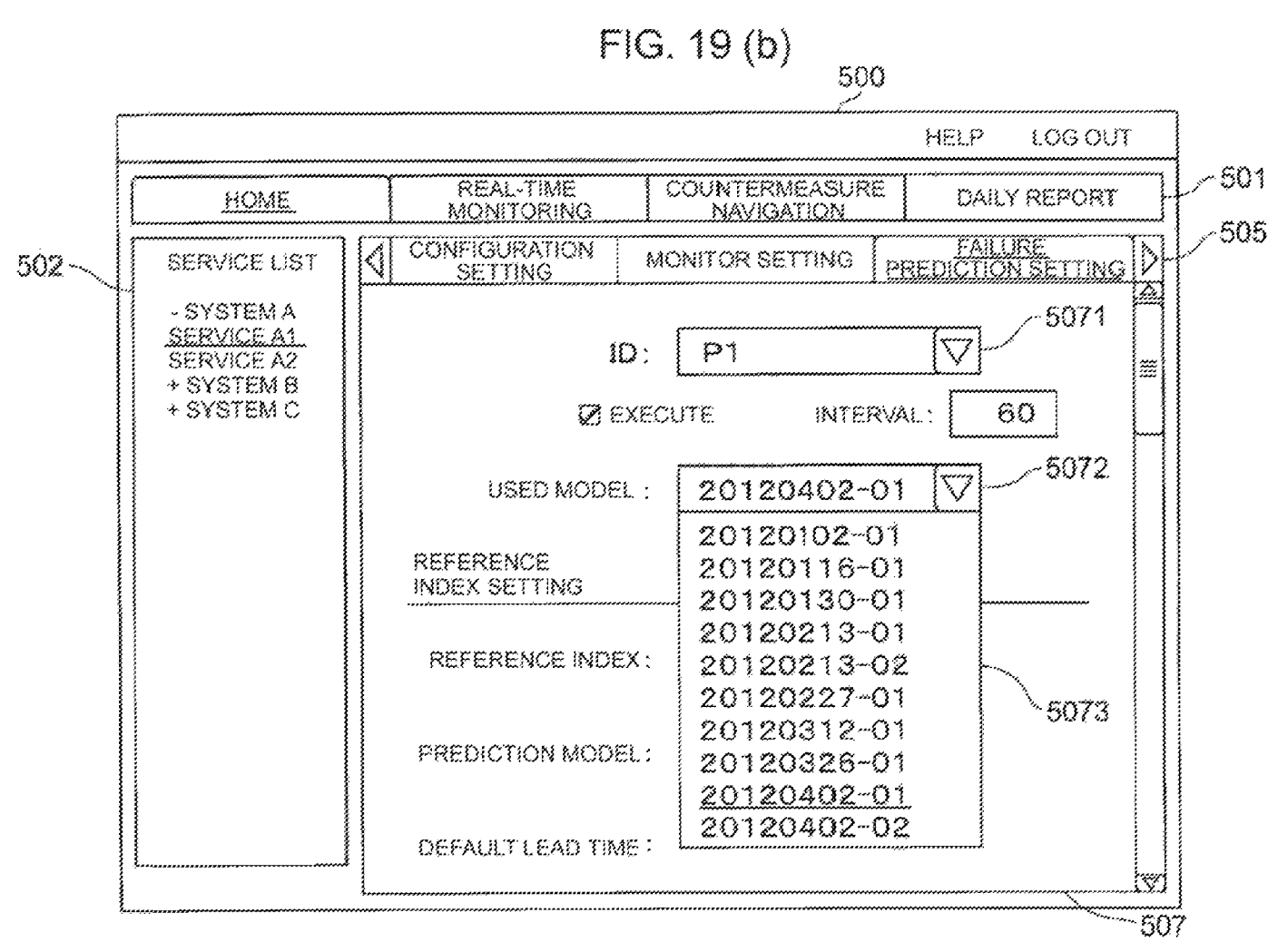

FIG. 19(b) shows the screen for selecting the system model that is used in the failure prediction processing.

The client screen 500 has a setting menu 505. The setting menu includes a "failure prediction setting" button, and the client screen displays a failure prediction setting frame 507 when the administrator selects and presses that button. The failure prediction setting frame includes a prediction profile name field 5071, a used model field 5072, and a used model designation drop-down list 5073. The prediction profile name field can display one prediction profile among the prediction profile stored in the prediction profile table. Moreover, the prediction profile name field concurrently serves as a drop-down list, and changes the prediction profile to be displayed with the selection and operation by the administrator as the trigger. The prediction profile to be displayed is hereinafter referred to as the selected prediction profile. The used model field displays the model ID of the selected prediction profile. When the administrator presses the button of the used model field, the client screen displays a used model designation drop-down list 5073. The used model designation drop-down list displays a list of the system models of the system corresponding to the system name field of the selected prediction profile among the system models stored in the model repository. The used model designation drop-down list displays the selected system model in the used model field with the administrator selecting one from that list as the trigger. Thereafter, the model ID of the selected system model is set in the model ID field of the selected prediction profile when, for example, the administrator selects and presses the OK button (not shown) as the trigger.

FIG. 20 is a diagram showing an example of the table that is output by the load generation device.

In order to execute the foregoing model generation processing, a table that concatenates the measured metrics and the performance metrics is required. While it is not difficult to collect the measured metrics with the OS loaded in the production server and the monitoring apparatus, the acquisition of the performance metrics is not that easy. Thus, the method of using a load generation device that is configured to artificially generate a processing load on the distributed application and processing the log that is output from that device may be adopted as needed for obtaining the performance metrics. With the load generation device, a program for generating the load is typically loaded in an information processing apparatus as a user process, but the load generation device may also be an independent device.

The table 406 is an example of a table showing the log of requests that were issued from the load generation device to the distributed application. The request log includes a thread ID field, a response time field, an elapsed time field, and a time stamp field.

Figure 21:
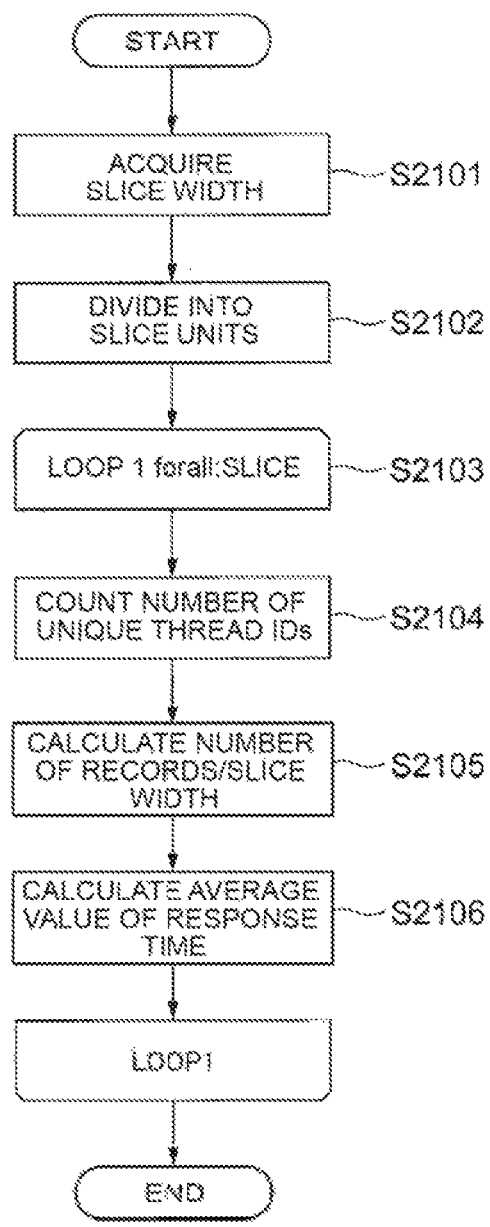
FIG. 21 is a flowchart showing an example of the operation of the processing for converting the log of the load generation device.

FIG. 21 is a diagram showing an example of the processing routine of converting the request log output from the load generation device into a performance metrics.

Foremost, the slice width is obtained (S2101). A slice width is a temporal width that is used as the unit in the request log conversion processing, and, typically, it is preferable to unify the slice width with the interval of the measured value shown in FIG. 4. Subsequently, the request log is divided into slice units (S2102). The following processing is performed to all divided slice units (S2103). Foremost, the unique thread ID is counted (S2104) to obtain the number of concurrent users. Next, the number of records is divided by the slice width (S2105) to obtain the request processing throughput. Subsequently, the average value of the response time is calculated (S2106) to obtain the average response time. The number of concurrent users, request processing throughput, and average response time calculated based on the foregoing processing can be used in the model generation processing as the performance metric of the distributed application.

While this embodiment calculates the number of concurrent users, request processing throughput, and average response time, other indexes may also be calculated according to the characteristics of the monitored system. This kind of conversion processing may be performed in the load generation device, or executed by the server in the service site upon transferring the request log.

The foregoing first embodiment explained a so-called multi-tenant configuration in which a single service site provides the service to a plurality of customer sites. Consequently, the customer can obtain the failure prediction result based on the Bayesian network without having to prepare processor resources in the customer site.

Embodiment 2

The second embodiment to which the present invention is applied is now explained.

The first embodiment explained a failure prediction system that uses the system model based on the Bayesian network, and the time series prediction together. This method is based on the premise that the generated model comprehensively includes that statuses that can be taken by the monitored system. Nevertheless, in actual system operation, there may be statuses that are not included in the measured value that was used during model generation.

Thus, in order to deal with the foregoing circumstances, this embodiment explains a failure prediction system that is configured so that the cluster analysis method can be concurrently used. Cluster analysis is one data analyzing method of classifying multi-dimensional data into groups referred to as clusters, and, for example, an algorithm referred to as K-means clustering is known. Based on this method, it is possible to detect the appearance of a measured value that is not classified as an existing cluster.

In other words, the measured values that were collected while the monitored system was operating normally are classified in advance based on cluster analysis. Subsequently, the distance from the reference point of the respective clusters that were generated in the prior analysis is calculated with regard to the measured values that can be sequentially acquired during the system operation, and if such distance exceeds a threshold, then it is determined that some kind of anomaly has occurred in the system. This distance basically corresponds to the anomaly score of the system.

Since the basic configuration is the same as the first embodiment, only the different portions will be explained.

Figure 22:
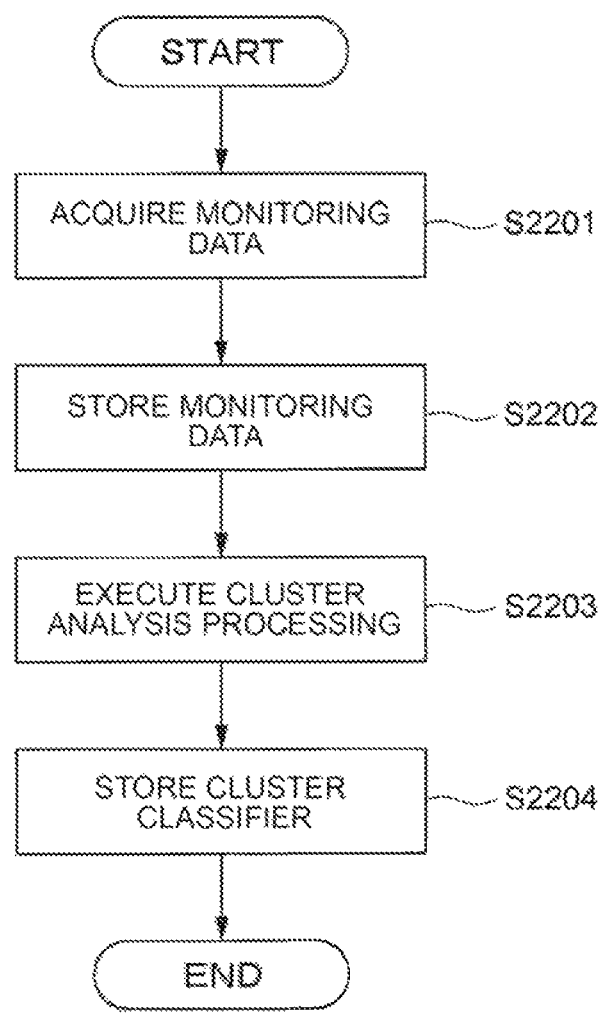
FIG. 22 is a flowchart showing an example of the operation of the clustering processing.

FIG. 22 is a diagram showing an example of the processing routine of the normal time duster generation that is performed by the prediction engine 201.

The prediction server acquires the measured value (step S2201), and stores the acquired measured value in the memory (step S2202). Next, the prediction server executes cluster analysis to the measured value (step S2203). Consequently, the prediction server stores the reference point group of each of the generated clusters as a cluster-based classifier in the memory or the storage (step S2204).

Figure 23:
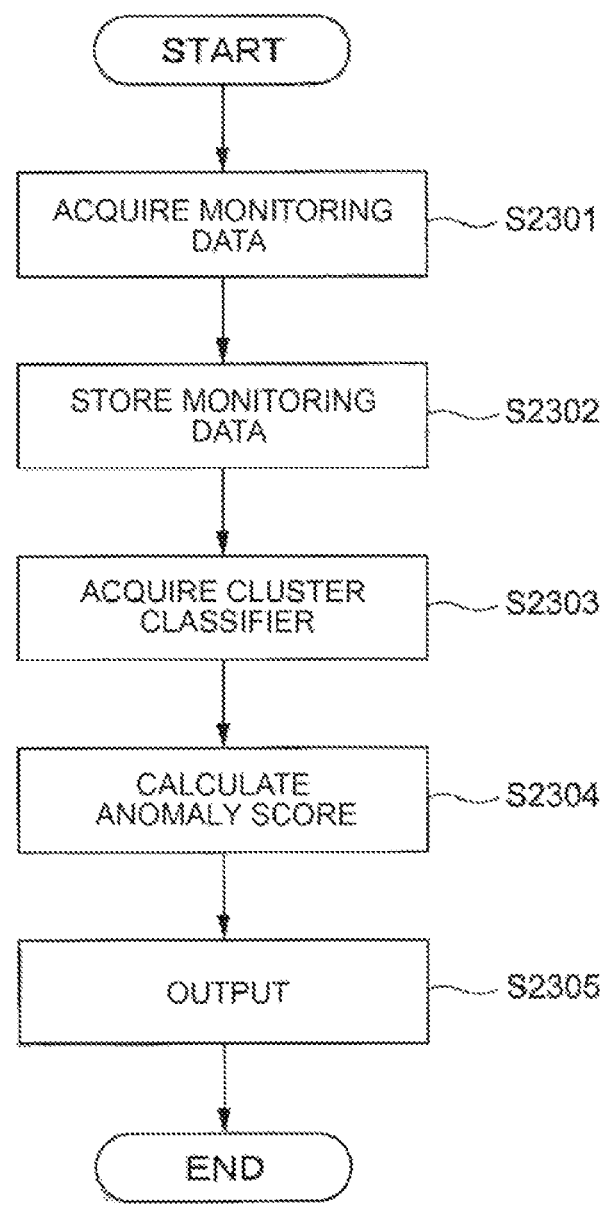
FIG. 23 is a flowchart showing an example of the operation of the system anomaly score calculation processing.

FIG. 23 is a diagram showing an example of the anomaly score calculation processing that is performed by the prediction engine 201.

The prediction server acquires the measured value (step S2301), and stores the acquired measured value in the memory (step S2302). Next, the prediction server acquires the duster-based classifier (step S2303), and calculates the system anomaly score from the measured value and the cluster-based classifier (step S2304). The prediction server thereafter outputs the obtained system anomaly score (step S2305).

Figure 24:
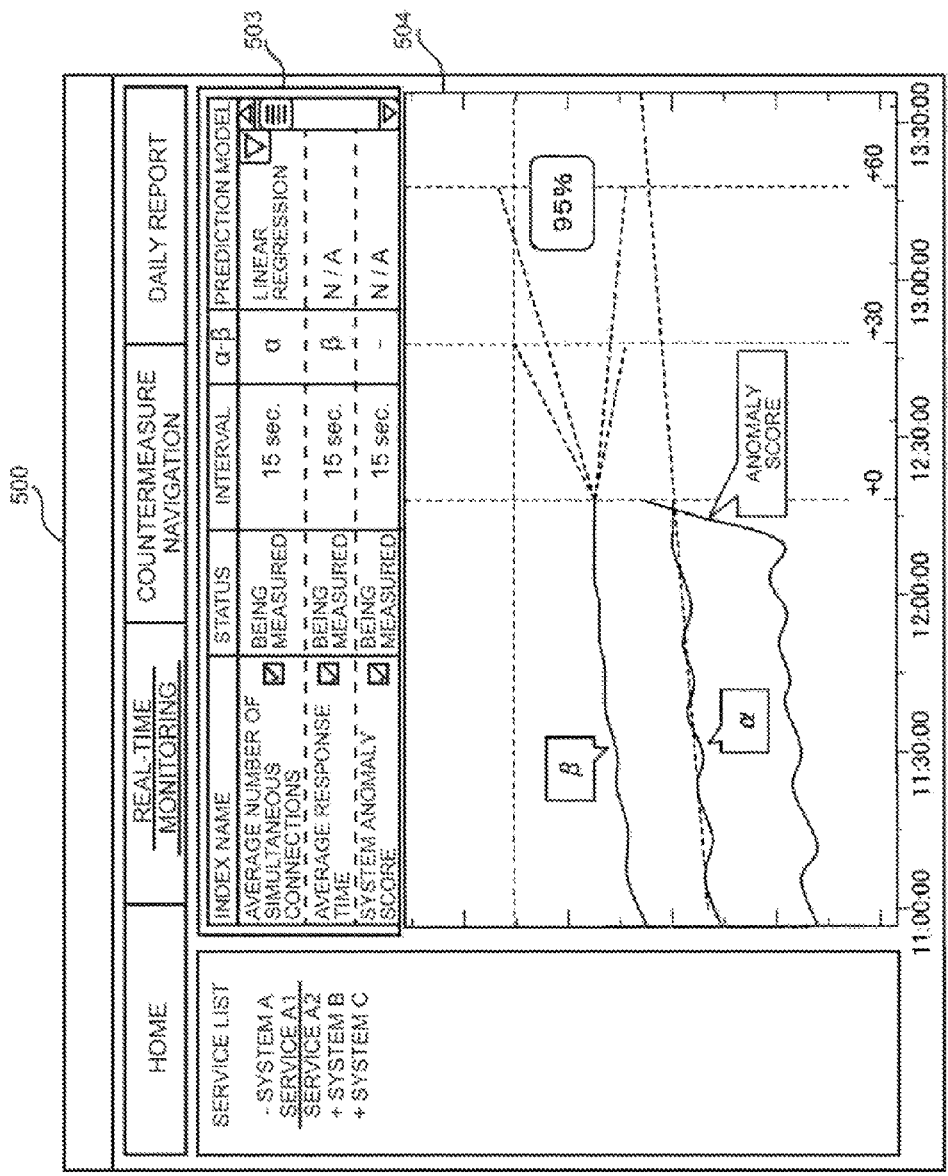
FIG. 24(*a*) is a layout diagram showing an example of the client screen that is set to display the system anomaly score.
Figure 24:
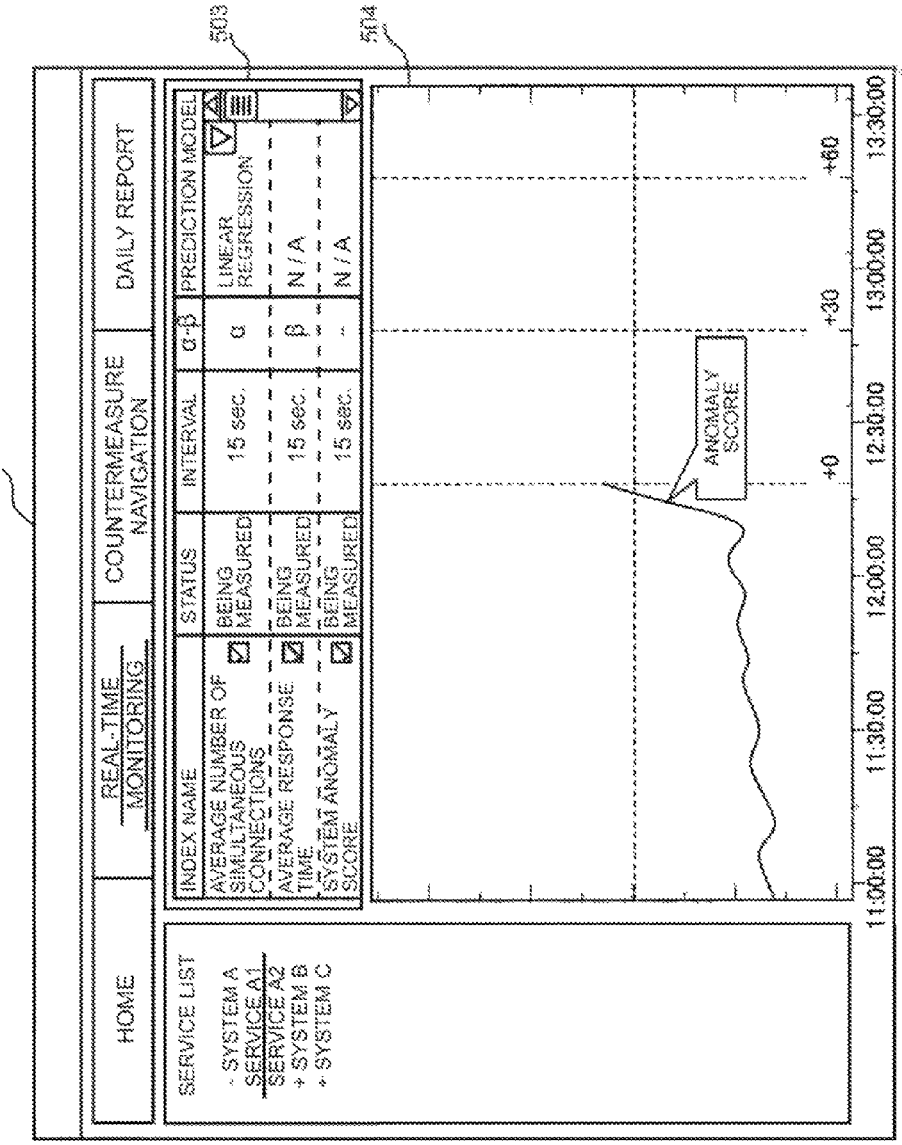

FIG. 24(a) is a diagram showing an example of the screen that is set to display the system anomaly score.

The index list 503 of the client screen 500 includes an index name field, and the respective records have a check box. When the check box of the record corresponding to the system anomaly score switches to a selectable state according to the administrator's input, data of the previously calculated system anomaly score is plotted as a time series on the left half of the boundary line displayed at substantially the center of the plot area 504. The other portions of the client screen are the same as the first embodiment.

FIG. 24(b) is a diagram showing another example of the screen that is set to display the system anomaly score.

When only the check box of the record corresponding to the system anomaly score displayed in the index list 503 of the client screen 500 has been selected, only the data of the system anomaly score is plotted in the plot area 504 as a time series. Moreover, the value that is set as the threshold of the system anomaly score is displayed as a horizontal line. The other portions of the client screen are the same as the example shown in FIG. 24(a).

Embodiment 3

The third embodiment to which the present invention is applied is now explained. The foregoing first embodiment explained a so-called multi-tenant configuration in which a single service site provides the service to a plurality of customer sites. In the foregoing case, the failure prediction processing is executed to a plurality of customer sites or customer systems based on the same priority for that service site. In other words, the execution of the failure prediction processing is controlled by the prediction profile table 411 and the task list table 412, and the configuration is such that the tasks recorded in the task list table are executed without any particularly differentiation based on priority.

Nevertheless, particularly with the failure prediction processing executed by the prediction server, the processor resources are consumed and there are temporal restrictions in the processing. Meanwhile, since there are limitations in the hardware resources capable of providing the service, it would be effective to set a priority in the plurality of failure prediction processes.

Thus, this embodiment explains an example where a priority is set in the tasks in the multi tenant configuration, and the processing is executed according to that priority. Since the basic configuration is the same as the first embodiment, only the different portions will be explained.

FIG. 25 is a diagram showing an example of the task list table.

The task list table 415 includes a priority field in addition to the respective fields of the task list table 412 shown in FIG. 9. The priority field stores the priority that is set upon the prediction engine 1113 executing the respective tasks. The scheduler 202 includes the priority in the message upon sending an execution message regarding the task in which "Y" is designated in the execution flag field among the tasks stored in the task list table. The task control unit 2018 of the prediction engine sets the priority and executes the task based on the priority included in the received execution message. As the method of designating the priority, adopted may be, for example, a method of using a priority setting API of the OS.

As a method of setting the value in the priority field of the task list table, for example, there is a method of using the value of the default lead time field of the prediction profile table 411. This is a method that utilizes the fact that, with a task with a longer default lead time, the period that the output result of the failure prediction processing is anticipated to be useful for the administrator, the priority of a task with a long default lead time is lowered.

As another method of setting a value in the priority field of the task list table, for example, there is a method of increasing the priority for tasks in which the number of nodes included in the graph structure stored in the model repository 413 is great. This is a method that focuses on the point that more computational resources are required for the probability inference processing as more nodes are included in the Bayesian network.

As another method of setting a value in the priority field of the task list table, for example, there is a method of increasing the priority of the failure prediction processing of a system as the number of items of the measured metrics stored in the system profile table 410 is greater. This method is based on the same reason of setting the priority according to the number of nodes of the graph structure stored in the model repository.

As another method of setting a value in the priority field of the task list table, for example, there is a method of acquiring the value of a prescribed period in the past with the current point in time as the reference with regard to the measured metrics or the performance metrics set in the reference index, and increasing the priority as a greater change is acknowledged. In order to quantify the level of change, the value of a prescribed period in the past of the measured metrics or the performance metrics is deemed to be the time series data, and a change point detection method such as the CUSUM algorithm for calculating auto covariance may be used.

With any of the methods described above, it should be easy to perform the association of the task list table and the other tables based on the ID of the respective records.

Note that the present invention is not limited to the foregoing embodiments, and also includes various modified examples. For example, the foregoing embodiments offered a detailed explanation for facilitating the understanding of the present invention, but the present invention is not necessarily limited to the configuration comprising all of the explained components. Moreover, a certain configuration of a certain embodiment may be substituted with a configuration of another embodiment, and a configuration of a certain embodiment may also be added to the configuration of another embodiment. Moreover, a part of a configuration of the respective embodiments may be added to, deleted from or substituted with another configuration.

Moreover, the respective configurations, functions, processing units, processing means and the like described above may also be realized via hardware by designing a part or the whole thereof with, for example, an integrated circuit. Moreover, the respective configurations, functions and the like described above may also be realized via software by the processor interpreting and executing the programs for realizing the respective functions. Information such as programs, tables, files and the like for realizing the respective functions may be stored in a memory, a storage device such as an HDD or an SSD, or stored in a storage medium such as an SD card or a DVD-ROM.

Moreover, the control lines and information lines are shown to the extent that considered necessary for explaining the present invention, and all control lines and information lines that may be required in a product are not necessarily shown. In reality, almost all of the configurations may be mutually connected.

REFERENCE SIGNS LIST

100 . . . information processing apparatus, 110 . . . production server, 111 . . . monitoring apparatus, 112 . . . storage server, 113 . . . prediction server, 114 . . . diagnostic server, 115 . . . portal server, 116 . . . monitoring client, 201 . . . prediction engine, 202 . . . scheduler, 210 . . . application program, 301 . . . customer site, 302 . . . service site

The invention claimed is:

1. A service system which is configured with one or more computers and performs a failure prediction of a plurality of monitored systems,
wherein the one or more computers are configured to:
receive measured values regarding a plurality of indexes from the monitored systems;
designate a prediction model for predicting a future measured value from the received measured values, from a plurality of prediction models, regarding a reference index which is a part of the plurality of indexes;
predict a predicted value of the reference index based on the designated prediction model;
generate a plurality of Bayesian networks targeting the reference index and a target index which is an index that is a part of the plurality of indexes but different from the reference index;
store the generated Bayesian networks in a memory or a storage of the one or more computers; and
calculate a probability that a measured value of the target index will become a predetermined value or fall within a predetermined value range based on the predicted value of the reference index, and a Bayesian network that is designated from the plurality of Bayesian networks by a received input,
wherein the predetermined value or predetermined value range that is used defines a predicted failure with respect to the plurality of monitored systems.

2. The service system according to claim 1,
wherein the one or more computers are configured to generate the Bayesian networks based on the received measured value of the reference index, and the measured value of the target index.

3. The service system according to claim 1,
wherein the measured value is data which is a quantification of an execution status of an application program executed by the monitored system.

4. The service system according to claim 1,
wherein the one or more computers are further configured to:
receive an input designating the reference index from the plurality of indexes for each of the plurality of monitored systems; and
set a different index for each monitored system as a reference index by managing, as a set, an identifier of the monitored system, the designated prediction model and the reference index.

5. The service system according to claim 1,
wherein the one or more computers are further configured to:
receive an input which designates the prediction model.

6. The service system according to claim 1,
wherein the one or more computers are further configured to:
receive an input which designates the predetermined value or value range to be used in the probability calculation.

7. The service system according to claim 1,
wherein the one or more computers are configured to control an execution priority of the processing of the generation of the plurality of Bayesian networks and the calculation of the probability.

8. The service system according to claim 7,
wherein the execution priority is effective even between different monitored systems.

9. The service system according to claim 7,
wherein the execution priority is controlled based on at least one among:
a target time of the probability calculation;
number of indexes of the monitored system; and
level of change in past measured values.

10. A program to be executed by one or more computers configuring a service system which performs a failure prediction of a plurality of monitored systems,
wherein the program:
receives measured values regarding a plurality of indexes from the monitored systems;
designates a prediction model for predicting a future measured value from the received measured values, from a plurality of prediction models, regarding a reference index which is a part of the plurality of indexes;
predicts a predicted value of the reference index based on the designated prediction model;

generates a plurality of Bayesian networks targeting the reference index and a target index which is an index that is a part of the plurality of indexes but different from the reference index;

stores the generated Bayesian networks in a memory or a storage of the one or more computers; and calculates a probability that a measured value of the target index will become a predetermined value or fall within a predetermined value range based on the predicted value of the reference index, and a Bayesian network that is designated from the plurality of Bayesian networks by a received input, wherein the predetermined value or predetermined value range that is used defines a predicted failure with respect to the plurality of monitored systems.

11. The program according to claim 10, wherein the program generates the Bayesian networks based on the received measured value of the reference index, and the measured value of the target index.

12. The program according to claim 10, wherein the measured value is data which is a quantification of an execution status of an application program executed by the monitored system.

13. The program according to claim 10, wherein the program:

receives an input designating the reference index from the plurality of indexes for each of the plurality of monitored systems; and can set a different index for each monitored system as a reference index by managing, as a set, an identifier of the monitored system, the designated prediction model, and the reference index.

14. The program according to claim 10, wherein the program:

receives an input which designates the prediction model.

15. The program according to claim 10, wherein the program:

receives an input which designates the predetermined value or value range to be used in the probability calculation.

16. The program according to claim 10, wherein the program controls an execution priority of the processing of the generation of the plurality of Bayesian networks and the calculation of the probability.

17. The program according to claim 16, wherein the execution priority is effective even between different monitored systems.

18. The program according to claim 16, wherein the execution priority is controlled based on at least one among:

a target time of the probability calculation;

number of indexes of the monitored system; and level of change in past measured values.

* * * * *